(12) United States Patent
Toshine et al.

(10) Patent No.: US 6,852,397 B2
(45) Date of Patent: Feb. 8, 2005

(54) COUNTERFEIT-PROOF VOLUME HOLOGRAM MULTILAYER STRUCTURE, AND COUNTERFEIT-PROOF VOLUME HOLOGRAM SEAL

(75) Inventors: Tetsuya Toshine, Tokyo (JP); Kenji Ueda, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 10/288,234

(22) Filed: Nov. 4, 2002

(65) Prior Publication Data

US 2003/0134105 A1 Jul. 17, 2003

(30) Foreign Application Priority Data

Nov. 5, 2001 (JP) .......................... 2001-339061

(51) Int. Cl.⁷ .............................. B32B 5/16; G02B 5/32
(52) U.S. Cl. ........................ 428/212; 428/323; 359/15
(58) Field of Search ........................... 428/212, 323, 428/42.2, 42.3, 41.7, 41.8, 916; 359/15

(56) References Cited

U.S. PATENT DOCUMENTS

| | | | | |
|---|---|---|---|---|
| 5,149,578 A | * | 9/1992 | Wheatley et al. | 428/213 |
| 5,500,313 A | * | 3/1996 | King et al. | 430/11 |
| 5,548,670 A | * | 8/1996 | Koike | 385/27 |
| 6,005,691 A | * | 12/1999 | Grot et al. | 359/2 |
| 6,066,378 A | * | 5/2000 | Morii et al. | 428/40.2 |
| 6,348,960 B1 | * | 2/2002 | Etori et al. | 349/112 |
| 6,506,468 B1 | * | 1/2003 | Morii et al. | 428/40.2 |
| 6,596,360 B2 | * | 7/2003 | Toshine et al. | 428/40.1 |

* cited by examiner

Primary Examiner—H Thi Le
(74) Attorney, Agent, or Firm—Dellett & Walters

(57) ABSTRACT

The present invention relates to a counterfeit-proof volume hologram multilayer structure capable of securely preventing a counterfeiter from replicating a volume hologram recorded therein. The multilayer structure comprises a transparent surface protective layer, a volume hologram layer, and an adhesive layer which are sequentially laminated and is characterized in that particles having particle diameter of 350 nm or more are dispersed in at least one of the transparent surface protective layer, the volume hologram layer, and the adhesive layer and that the refractive index ratio ($n_F/n_B$) is set to be not less than 1.05 or not greater than 0.95, wherein $n_F$ is the refractive index of the particles and $n_B$ is the refractive index of the medium in which the particles are dispersed, or characterized in that at least either the refractive index ratio ($n_P/n_H$) between the transparent surface protective layer and the volume hologram layer or the refractive index ratio ($n_H/n_A$) between the volume hologram layer and the adhesive layer is set to be not less than 1.08, wherein $n_P$ is the refractive index of the transparent surface protective layer, $n_H$ is the refractive index of the volume hologram layer, and $n_A$ is the refractive index of the adhesive layer.

15 Claims, 2 Drawing Sheets

COUNTERFEIT-PROOF VOLUME HOLOGRAM MULTILAYER STRUCTURE, AND COUNTERFEIT-PROOF VOLUME HOLOGRAM SEAL

BACKGROUND OF THE INVENTION

The present invention relates to a volume hologram multilayer structure such as a volume hologram transfer foil or a volume hologram label which is stuck to a surface of an adherend such as a photograph or personal information attached to an identification card, an examination admission ticket, a passport, a certificate, or the like so as to form a transparent volume hologram for the purpose of ensuring security, and to a volume hologram seal in which a transparent volume hologram is formed on an adherend by using a volume hologram multilayer structure. The present invention relates to a counterfeit-proof volume hologram multilayer structure and a counterfeit-proof volume hologram seal making the replication of the volume hologram impossible.

Holography is a technology of recording both the amplitude content and the phase content of light waves reflected on a surface. A hologram made by this technology enables a representation of a three-dimensional image seen from different view points, differently from an ordinary photograph which contains an image seen from one view point only. The manufacture of holograms requires sophisticated technology and a complex and expensive apparatus. Accordingly, the counterfeit or alteration of hologram is generally difficult. Under favor of the difficulty in counterfeit, some attempts at using the holography as the counterfeit-proof means for identification cards, certificates, and the like had been executed.

While the sophisticated optical design technology and an expensive equipment are required for the hologram replication, the hologram replication is achieved by faying a photosensitive material for replication to a master hologram and irradiating the photosensitive material and the volume hologram with laser beam at the photosensitive material side. To cope with this, a counterfeit-proof volume hologram multilayer structure having a polarization control layer attached to one surface of a volume hologram thereof has been proposed (see Japanese Unexamined Patent Publication No. H6-138803). However, there is a problem that the polarization control layer is easy to be found.

It is an object of the present invention to provide a counterfeit-proof volume hologram multilayer structure and a counterfeit-proof volume hologram seal, capable of securely preventing the replication of a volume hologram recorded therein even if a counterfeiter attempts to replicate the volume hologram recorded in the volume hologram multilayer structure or the volume hologram seal as a master.

SUMMERY OF THE INVENTION

A first counterfeit-proof volume hologram multilayer structure of the present invention comprises a transparent surface protective layer, a volume hologram layer, and an adhesive layer which are sequentially laminated, and is characterized in that particles having particle diameter of 350 nm or more are dispersed in at least one of the transparent surface protective layer, the volume hologram layer, and the adhesive layer and that the refractive index ratio $(n_F/n_B)$ is set to be not less than 1.05 or not greater than 0.95, wherein $n_F$ is the refractive index of the particles and $n_B$ is the refractive index of the medium in which the particles are dispersed.

A second counterfeit-proof volume hologram multilayer structure of the present invention comprises a transparent surface protective layer, a volume hologram layer, and an adhesive layer which are sequentially laminated, and is characterized in that at least either the refractive index ratio $(n_P/n_H)$ between the transparent surface protective layer and the volume hologram layer or the refractive index ratio $(n_H/n_A)$ between the volume hologram layer and the adhesive layer is set to be not less than 1.08, wherein $n_P$ is the refractive index of the transparent surface protective layer, $n_H$ is the refractive index of the volume hologram layer, and $n_A$ is the refractive index of the adhesive layer.

A third counterfeit-proof volume hologram multilayer structure of the present invention comprises a transparent surface protective layer, a first adhesive layer, a volume hologram layer, and a second adhesive layer which are sequentially laminated, and is characterized in that particles having particle diameter of 350 nm or more are dispersed in at least one of the transparent surface protective layer, the first adhesive layer, the volume hologram layer, and the second adhesive layer and that the refractive index ratio $(n_F/n_B)$ is set to be not less than 1.05 or not greater than 0.95, wherein $n_F$ is the refractive index of the particles and $n_B$ is the refractive index of the medium in which the particles are dispersed.

A fourth counterfeit-proof volume hologram multilayer structure of the present invention comprises a transparent surface protective layer, a first adhesive layer, a volume hologram layer, and a second adhesive layer which are sequentially laminated, and is characterized in that at least one of the refractive index ratio $(n_P/n_{A1})$ between the transparent surface protective layer and the first adhesive layer, the refractive index ratio $(n_{A1}/n_H)$ between the first adhesive layer and the volume hologram layer, and the refractive index ratio $(n_H/n_{A2})$ between the volume hologram layer and the second adhesive layer is set to be not less than 1.08, wherein $n_P$ is the refractive index of the transparent surface protective layer, $n_{A1}$ is the refractive index of the first adhesive layer, $n_H$ is the refractive index of the volume hologram layer, and $n_{A2}$ is the refractive index of the second adhesive layer.

In any one of the above counterfeit-proof volume hologram multilayer structures, the haze value of the layer into which the particles are dispersed is in a range from 5% to 15%.

In any one of the above counterfeit-proof volume hologram multilayer structures, the transparent surface protective layer is colored by a pigment or dye having absorbency relative to reconstruction wavelength light for the volume hologram.

In any one of the above counterfeit-proof volume hologram multilayer structures, the transparent surface protective layer is a transparent surface protective coating film or is a combination of a transparent surface protective coating film and a substrate laminated on the outer surface of the transparent surface protective coating film.

In any one of the above counterfeit-proof volume hologram multilayer structures, the transparent surface protective layer is a transparent surface protective film or is a combination of a transparent surface protective film and a substrate laminated on the outer surface of the transparent surface protective film.

In any one of the above counterfeit-proof volume hologram multilayer structures, the adhesive layer is a heat-sensitive adhesive layer or a pressure-sensitive adhesive layer.

A first counterfeit-proof volume hologram seal of the present invention comprises a transparent surface protective layer, a volume hologram layer, an adhesive layer, and an adherend which are sequentially laminated, and is characterized in that particles having particle diameter of 350 nm or more are dispersed in at least one of the transparent surface protective layer, the volume hologram layer, and the adhesive layer and that the refractive index ratio ($n_F/n_B$) is set to be not less than 1.05 or not greater than 0.95, wherein $n_F$ is the refractive index of the particles and $n_B$ is the refractive index of the medium in which the particles are dispersed.

A second counterfeit-proof volume hologram seal of the present invention comprises a transparent surface protective layer, a volume hologram layer, an adhesive layer, and an adherend which are sequentially laminated, and is characterized in that at least either the refractive index ratio ($n_P/n_H$) between the transparent surface protective layer and the volume hologram layer or the refractive index ratio ($n_H/n_A$) between the volume hologram layer and the adhesive layer is set to be not less than 1.08, wherein $n_P$ is the refractive index of the transparent surface protective layer, $n_H$ is the refractive index of the volume hologram layer, and $n_A$ is the refractive index of the adhesive layer.

A third counterfeit-proof volume hologram seal of the present invention comprises a transparent surface protective layer, a first adhesive layer, a volume hologram layer, a second adhesive layer, and an adherend which are sequentially laminated, said counterfeit-proof volume hologram seal being characterized in that particles having particle diameter of 350 nm or more are dispersed in at least one of the transparent surface protective layer, the first adhesive layer, the volume hologram layer, and the second adhesive layer and that the refractive index ratio ($n_F/n_B$) is set to be not less than 1.05 or not greater than 0.95, wherein $n_F$ is the refractive index of the particles and $n_B$ is the refractive index of the medium in which the particles are dispersed.

A fourth counterfeit-proof volume hologram seal of the present invention comprises a transparent surface protective layer, a first adhesive layer, a volume hologram layer, a second adhesive layer, and an adherend which are sequentially laminated, and is characterized in that at least one of the refractive index ratio ($n_P/n_{A1}$) between the transparent surface protective layer and the first adhesive layer, the refractive index ratio ($n_{A1}/n_H$) between the first adhesive layer and the volume hologram layer, and the refractive index ratio ($n_H/n_{A2}$) between the volume hologram layer and the second adhesive layer is set to be not less than 1.08, wherein $n_P$ is the refractive index of the transparent surface protective layer, $n_{A1}$ is the refractive index of the first adhesive layer, $n_H$ is the refractive index of the volume hologram layer, and $n_{A2}$ is the refractive index of the second adhesive layer.

The first through fourth counterfeit-proof volume hologram multilayer structures having excellent hologram visibility and also having the following counterfeit prevention function. That is, if a counterfeiter attempts to replicate a volume hologram recorded in the volume hologram multilayer structure or the volume hologram seal as a master by attaching a replication medium to the surface of the volume hologram multilayer structure or the volume hologram seal and irradiating them with laser beam of a recording wavelength (reconstruction wavelength) from the replication medium side, the read-out beam is scattered so as to make a hologram image recorded in the replication medium not bright enough and reflected lights between layers are increased so as to record undesirable interference fringes in the replication medium, thereby achieving the counterfeit prevention.

DESCRIPTION OF THE PREFERRED EMBODIMENTS

Figure 1A:
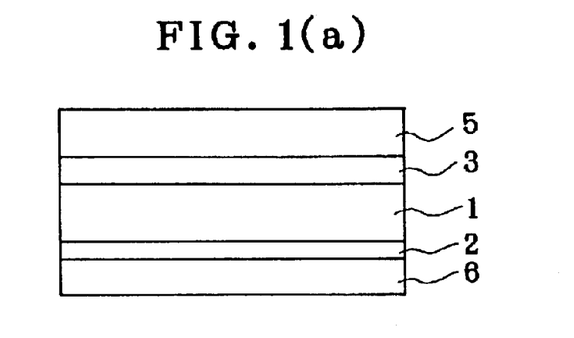
FIG. 1(a) is a sectional view of a first/second counterfeit-proof volume hologram multilayer structure of the present invention, for explaining the volume hologram multilayer structure
Figure 1B:
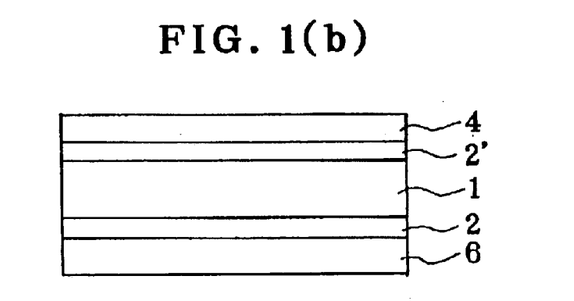
FIG. 1(b) is a sectional view of a third/fourth counterfeit-proof volume hologram multilayer structure of the present invention, for explaining the volume hologram multilayer structure.

FIG. 1(a) is a sectional view of a first or second counterfeit-proof volume hologram multilayer structure and FIG. 1(b) is a sectional view of a third or fourth counterfeit-proof volume hologram multilayer structure. In FIG. 1(a), numeral 1 designates a volume hologram layer, 2 designates an adhesive layer, 3 designates a transparent surface protective layer, 5 designates a substrate, and 6 designates a release sheet. In FIG. 1(b), numeral 1 designates a volume hologram layer, 2 designates a second adhesive layer, 2' designates a first adhesive layer, 4 designates a transparent surface protective film, and 6 designates a release sheet. It should be noted that he substrate 5 may be eliminated from the volume hologram multilayer structure of FIG. 1(a) and that the volume hologram multilayer structure of FIG. 1(b) may have a substrate 5 on the transparent surface protective film.

The first counterfeit-proof volume hologram multilayer structure of the present invention will be described with reference to FIG. 1(a). It should be understood that particles of which particle diameter is 350 nm or more (hereinafter, sometimes called "large-diameter particles") are not shown in the drawings.

Figure 2A:
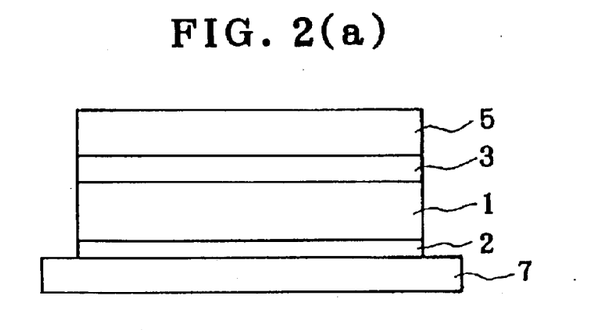
FIG. 2(a) is a sectional view of a first/second counterfeit-proof volume hologram seal of the present invention, for explaining the volume hologram seal

The first counterfeit-proof volume hologram multilayer structure of the present invention has a construction in which the transparent surface protective layer 3 such as a transparent surface protective coating film and the substrate 5 are laminated on one surface of the volume hologram layer 1, while the adhesive layer 2 is laminated on the other surface of the volume hologram layer 1. The release sheet 6 is just for protecting the adhesive layer 2 and is supplied if required. By releasing the release sheet 6 and applying the volume hologram multilayer structure to an adherend such that the adhesive layer meets the adherend, the counterfeit-proof volume hologram seal as shown in FIG. 2(a) can be obtained.

In the first counterfeit-proof volume hologram multilayer structure, at least one of the transparent surface protective layer, the volume hologram layer, and the adhesive layer has particles of which particle diameter is 350 nm or more dispersed therein and the refractive index ratio ($n_F/n_B$) is set to be not less than 1.05 or not greater than 0.95, wherein $n_F$ is the refractive index of the particles and $n_B$ is the refractive index of a medium in which the particles are dispersed. It is preferable to disperse the large-diameter particles into the transparent surface protective layer. However, the large-diameter particles may be dispersed into the volume hologram layer or the adhesive layer. Alternatively, the large-diameter particles may be dispersed into all of the transparent surface protective layer, the volume hologram layer, and the adhesive layer.

Hereinafter, explanation will be given on the particle diameter of particles being 350 nm or more and explanation on the refractive index ratio ($n_F/n_B$) being not less than 1.05 or not greater than 0.95. For reproducing the volume hologram, a reconstruction wavelength of 480 or more and 550 nm at the longest is normally used in terms of spectral luminous efficacy. In the current laser technology, solid-state laser of 532 nm or the like is usually used as the laser capable of providing large output and stable oscillation.

In case of dispersing the particles into transparent medium, the size parameter α of scattering strength is represented by $α=πD/λ$ {wherein D is particle diameter (nm) and λ is wavelength of scattering light (nm)}. When α<0.4, Rayleigh scattering is dominant and short-wavelength light is therefore preferentially scattered. On the other hand, when α>0.4, Mie scattering is dominant. When the Rayleigh scattering is dominant, scattering hardly takes place with relatively long-wavelength laser beam because the scattered light-intensity of Rayleigh scattering is in inverse proportion to $λ^4$. On the other hand, when Mie scattering is dominant, scattering takes place even with relatively long-wavelength laser beam because the scattered light-intensity is in inverse proportion to λ. For obtaining the particle diameter capable of scattering the read-out beam, the parameter α and the reconstruction wavelength (λ) are defined as follows. Because Mie scattering is dominant when the reconstruction wavelength in the range over 480 nm, α>0.4 so that a value at which forward scattering becomes relatively strong is selected, i.e. α=2.0. By substituting α=2.0 and λ=550 nm, the particle diameter of particles calculated from the above equation is 350 nm or more. That is, when the particle diameter is 350 nm or more, the scattering of the read-out beam is occurred, thereby enabling the prevention of counterfeit. The range of particle diameter of particles depends on the relation to the coatability and the type of the layer in which large-diameter particles are dispersed and is in a range from 350 nm to 5 μm.

In the relation between the size parameter α and the scattered intensity, the refractive index ratio ($n_F/n_B$) of the refractive index $n_F$ of the particles to the refractive index $n_B$ of the medium being not less than 1.05 or not greater than 0.95 facilitates the scattering of incident beam and read-out beam, thereby enabling the prevention of counterfeit. From the relation to the material and the relation to layer in which large-diameter particles are dispersed, the refractive index ratio ($n_F/n_B$) is 2 at the maximum and 0.75 at the minimum. The haze value depends on the adding amount of particles and is generally from 5% to 15% in terms of visibility of hologram.

Though the first and third counterfeit-proof volume hologram multilayer structure of the present invention will be mainly described with reference to the case where the refractive index ratio ($n_F/n_B$) of the refractive index $n_F$ of the particles to the refractive index $n_B$ of the medium is 1.05 or more, the same is true for the case where the refractive index ratio ($n_F/n_B$) is 0.95 or less, that is, the case of inverse number. When the refractive index ratio ($n_F/n_B$) is over 0.95 and less than 1.05, the scattering is insufficient, thus allowing the replication. Therefore, the refractive index ratio ($n_F/n_B$) in this range is unfavorable.

In the first counterfeit-proof volume hologram multilayer structure of the present invention, the large-diameter particles may be dispersed into any one of the transparent surface protective layer, the volume hologram layer, and the adhesive layer, and is preferably dispersed into the transparent surface protective layer. In case of coloring the transparent surface protective layer, it is not necessary but is preferable that the large-diameter particles are dispersed into the transparent surface protective layer. Setting the refractive index ratio between layers to be not less than 1.08 as will be described with regard to the second counterfeit-proof volume hologram multilayer structure also achieves the counterfeit prevention. In this case, it is enough to control at least either the refractive index ratio between the transparent surface protective layer and the volume hologram layer or the refractive index ratio between the volume hologram layer and the adhesive layer. It is preferable to control the refractive index ratio between the transparent surface protective layer and the volume hologram layer. In this case, the other refractive index ratio may be set to be 1 or less. The same is true for the first through fourth volume hologram multilayer structures.

Hereinafter, the lamination construction of the first counterfeit-proof volume hologram multilayer structure will be described concretely. The volume hologram layer 1 is a photosensitive material layer in which coherent beams between object beam and reference beam are recorded so that the three-dimensional structure of interference fringes is recorded. The thickness of the layer is enough greater than the interval of interference fringes. The formation of volume hologram layer is conducted by recording coherent beams between object beam and reference beam directly in a volume hologram-recording medium layer or replicating a master hologram by that the master is attached to a volume hologram-recording medium and then exposed to light. The latter process is used for industrial purposes.

Generally, examples of volume hologram-recording medium include known volume hologram recording materials such as silver-salt materials, dichromated gelatin emulsions, photopolymerizable resins, and photocrosslikable resins. In terms of production efficiency, it is preferable for the volume hologram of the present invention to use (1) a photosensitive material which comprises a binder resin, a photopolymerizable compound, a photoinitiator, and a sensitizing dye, and (2) a photosensitive material comprising a cationic polymerizable compound, a radical polymerizable compound, a radical photoinitiator which sensitizes to light beam of specific wavelength to polymerize the radical polymerizable compound, and cationic photoinitiator which sensitizes to light beam of another wavelength to polymerize the cationic polymerizable compound.

Examples of the binder resin in the photosensitive material (1) include compolymers comprising at least one copolymerizable component selected from the group consisting of poly(meth)acrylic acid ester or its partial hydrolysate, polyvinyl acetate or its hydrolysate, acrylic acid, and acrylic ester, mixtures of the compolymers, polyisoprene, polybutadiene, polychloroprene, polyvinyl alcohol or polyvinyl acetal as partially acetallized product of polyvinyl alcohol, polyvinyl butyral, polyvinyl acetate, vinyl chloride-vinyl acetate copolymer, and mixtures of the above binder resins. The recorded hologram is stabilized by the monomer migration through heating. To this end, it is preferable that these binder resins have such a relatively low glass transition temperature as to facilitate the monomer migration.

Examples of the photopolymerizable compounds include photopolymerizable, photo-linkable monomers, oligomers and prepolymers, each containing at least one ethylenical unsaturated bond per molecule as will be explained later, and mixtures thereof. Exemplary compounds are unsaturated carboxylic acids or their salts, esters of unsaturated carboxylic acids and aliphatic polyvalent alcohol compounds, and amide combined products of unsaturated carboxylic acids and aliphatic polyvalent amine compounds.

Examples of the unsaturated carboxylic acid monomers include acrylic acid and methacrylic acid. Examples of the ester monomers of aliphatic polyvalent alcohol compounds and unsaturated carboxylic acids include acrylic acid esters such as ethylene glycol diacrylate and triethylene glycol diacrylate, methacrylic acid esters such as tetramethylene glycol dimethacrylate and triethylene glycol dimethacrylate, itaconic acid esters such as ethylene glycol diitaconate and propylene glycol diitaconate, crotonic acid esters such as ethylene glycol isocrotonate and tetramethylene glycol dicrotonate, and isocrotonic acid esters such as ethylene glycol diisocrotonate and pentaerythritol diisocrotonate. In addition, examples of the maleic acid esters include ethylene glycol dimaleate and triethylene glycol dimaleate. Examples of he halogenated unsaturated carboxylic acids include 2,2,3,3-tetrafluoropropyl acrylate, and 1H,1H,2H,2H-heptadecafluorodecyl acrylate. Examples of the amide monomer of unsaturated carboxylic acids and aliphatic polyvalent amine compounds include methylenebisacrylamide and methylenebismethacrylamide Examples of the photoinitiator in the initiator system include 1,3-di(t-butyldioxycarbonyl)benzophenone, 3,3',4,4'-tetrakis(t-butyldioxycarbonyl)benzophenone, N-phenylglycine, 2,4,6-tris(trichloromethyl)-s-triazine, 3-phenyl-5-isooxazolone, 2-mercaptobenzimidazole, and imidazole dimers.

In terms of the stabilization of the recorded hologram, the photoinitiator should preferably be removed by decomposition after hologram recording. For instance, organic peroxide initiators are preferably employed because of being easy to decompose by ultraviolet irradiation.

Examples of the senstizing dyes are those having absorption light at 350 to 600 nm such as thiopyrylium salt dyes, merocyanine dyes, quinoline dyes, styrylquinoline dyes, ketocoumarin dyes, thioxanthene dyes, xanthene dyes, oxonol dyes, cyanine dyes, rhodamine dyes, thiopyrylium salt dyes, pyrylium ion dyes, and diphenylidonium ion dyes. It should be noted that it is acceptable to use sensitizing dyes having absorption light at a wavelength not greater than 350 nm or not smaller than 600 nm.

The proportion of the volume hologram-recording medium comprising the binder resin, the photopolymerizable compound, the photoinitiator, and the sensitizing dye is as follows. The photopolymerizable compound should be used in an amount of 10 parts by weight to 1000 parts by weight, preferably 10 parts by weight to 100 parts by weight, per 100 parts by weight of the binder resin. The photoinitiator should be used in an amount of 1 part by weight to 10 parts by weight, preferably 5 parts by weight to 10 parts by weight, per 100 parts by weight of the binder resin. The sensitizing dye should be used in an amount of 0.01 parts by weight to 1 part by weight, preferably 0.01 parts by weight to 0.5 parts by weight, per 100 parts by weight of the binder resin.

Other components of the volume hologram-recording media, for instance, are plasticizers, glycerin, diethylene glycol, triethylene glycol and a variety of nonionic, anionic and cationic surface active agents.

The photosensitive material (1) is dissolved in a suitable solvent such as acetone and methyl ethyl ketone, to form a coating solution having a solid content of 15% by weight to 25% by weight.

If the support film is in a sheet form, the coating solution may be applied thereto by means of bar coating, spin coating, dipping or the like. If the support film is a roll or continuous form, the coating solution may be applied thereto by means of gravure coating, roll coating, die coating, comma coating or the like. The coating solution is solidified by drying or curing means fitting for the type of the coating solution used. The thus obtained volume hologram-recording medium has a thickness of 0.1 μm to 50 μm, preferably 5 μm to 20 μm. If necessary, a protective film is stuck thereto. The suitable material for the volume hologram-recording medium is, for instance, "OmniDex 801" available from DuPont Company.

The photosensitive material sensitizes to laser beams of specific wavelength. Using two laser beams, e.g., an argon ion laser (wavelength of 514.5 nm) or a krypton ion laser (wavelength of 647 nm), interference fringes or coherent beams between object beam and reference beam are recorded in the volume hologram-forming layer. Alternatively, by faying a master volume hologram to the volume hologram-forming layer and, then, entering an argon ion laser (wavelength of 514.5 nm) into the volume hologram-forming layer side, interference fringes between the light reflected from the master hologram and the incident light are recorded in the volume hologram-recording layer to impart volume hologram information thereto. After that, the volume hologram-recording layer with the recorded volume hologram therein is processed into a stable volume hologram layer through the steps of heating the recording layer at 100° C. for 10 minutes to diffuse and migrate the photopolymerizable compound, and irradiating the recording layer with ultraviolet radiation of 0.1 to 10,000 mJ/cm$^2$, preferably 10 to 5,000 mJ/cm$^2$ from a light source such as a super high pressure mercury lamp, a high pressure mercury lamp, a carbon arc, a xenon arc or a metal halide lamp, thereby decomposing the photoinitiator.

In the second place, the photosensitive material (2) comprises a cationic polymerizable compound which takes its liquid state at room temperature, a radical polymerizable compound, a radical photoinitiator which sensitizes to laser beams of specific wavelength to polymerize the radical polymerizable compound, and cationic photoinitiator which sensitizes little to light of the specific wavelength and sensitizes to light beam of another wavelength to polymerize the cationic polymerizable compound.

After the photosensitive material is applied to a support film, the photosensitive material is irradiated with a light beam such as a laser beam to which the radical photoinitiator sensitizes, and is then irradiated with a light beam which has a wavelength different from that the above laser beam and to which the cationic photoinitiator sensitizes, thereby recording a hologram. After the radical polymerizable compound is polymerized by the laser irradiation (hereinafter, referred to "the first exposure"), the entire exposure (hereinafter, referred to "the post exposure") as the next step is conducted to decompose the cationic photoinitiator in the compound so as to produce Bronsted acid and Lewis acid. Because of these acids, the cationic polymerizable compound is polymerized.

Used as the cationic polymerizable compound of a type taking the liquid state at room temperature in order to conduct the polymerization of the radical polymerizable compound in relatively low viscosity composition during the whole. Examples of such cationic polymerizable compound include diglycerol polyglycidyl ether, pentaerythritol polyglycidyl ether, 1,4-bis(2,3-epoxypropoxy perfluoro isopropyl)cyclohexane, Sorbitol polyglycidyl ether, trimethylolpropane polyglycidyl ether, resorcinol diglycidyl ether, 1,6-hexanediol diglycidyl ether, polyethylene glycol diglycidyl ether, and phenyl diglycidyl ether.

Suitably used as the radical polymerizable compound are those each containing at least one ethylenical unsaturated double bond per molecule. The average refractive index of the radical polymerizable compound is greater than that of the cationic polymerizable compound preferably by 0.02 or more. Since the refractive index modulation becomes insufficient, it is not preferable that the average refractive index of the radical polymerizable compound is smaller than that of the cationic polymerizable compound. Examples of the radical polymerizable compound include acryl amide, methacrylic amide, stylene, 2-bromostyrene, phenyl acrylate, 2-phenoxy ethyl acrylate, 2,3-naphthalenedicarboxylic acid(acryloxyethyl)monoester, mithylphenoxy ethyl acrylate, nonyl phenoxy ethyl acrylate, and β-acryloxyethyl hydrogen phthalate.

The radical photoinitiator may be an initiator which can produce active radicals when subjected to the first exposure for hologram formation and wherein the active radicals can polymerize the radical polymerizable compound. A combination of a sensitizer as a light-absorbing component and an active-radical producing compound or an acid producing compound may be employed. The sensitizer used in the radical photoinitiator is usually a colored compound such as dyes capable of absorbing visible laser beams. Among the dyes, cyanine dyes are preferable for forming transparent and colorless holograms. Since the cyanine dye is generally easily decomposed by light, the dye in a formed hologram is decomposed by leaving the hologram under room light or sun light for several hours through several days so that the hologram has no absorption in the visible range. Therefore, by using the cyanine dye, a transparent and colorless hologram can be obtained. Specific examples of the cyanine dye are anhydro-3,3'-dicalboxymethyl-9-ethyl-2,2'-thiacarbocyaninebetaine, anhydro-3-calboxymethyl-3',9-diethyl-2,2'-thacarbocyaninebetaine, 3,3',9-toriethyl-2,2'-thacarbocyaninebetaine iodine salt, and 3,9-diethyl-3'-calboxymethyl-2,2'-thacarbocyaninebetaine iodine salt.

The active-radical producing compound which can be used with the cyanine dye may be diaryliodonium salt or 2,4,6-substitute-1,3,5-triazine. When high sensitivity is required, the diaryliodonium salt is preferably used. Specific examples of the diaryliodonium salt include diphenyliodonium, 4,4'-dichloro diphenyliodonium, and 4,4'-dimethoxy diphenyliodonium. On the other hand, examples of the 2,4,6-substitute-1,3,5-triazine include 2-methyl-4,6-bis(trichloromethyl)-1,3,5-triazine, and 2,4,6-tris(trichloromethyl)-1,3,5-triazine.

The cationic photoinitiator may be an initiator which sensitizes little to the first exposure and sensitizes to the post exposure irradiating a light beam of wavelength different from that of the first exposure to produce Bronsted acid or Lewis acid, thereby polymerizing the cationic polymerizable compound. The preferable initiator does not polymerize the cationic polymerizable compound during the first exposure. Examples of the cationic photoinitiator include diaryliodonium salts, triarylsulfonium salts, iron-allene complexes. Among diaryliodonium salts, preferably used as the cationic photoinitiator may be tetrafluoroborate, hexafluorophosphate, hexafluoroarsenate, and hexafluoroantimonate of iodoniums listed with regard to the radical photoinitiator. Among triarylsulfonium salts, preferably used as the cationic photoinitiator may be triphenylsulfonium and 4-tertiary butyl tripherylsulfonium.

If required, a binder resin, a thermal polymerization inhibitor, a silane coupling agent, a plasticizer, a coloring agent, and/or the like may be used with the photosensitive matter. The binder resin is used when it is required to improve the coatability or the uniformity of the layer thickness of the matter before the hologram formation or to ensure the stable existence of interference fringes, formed through polymerization by irradiation of light such as laser beam, until the post exposure. The binder resin may be any one of binder resins having good compatibility relative to the cationic polymerizable compound and the radical polymerizable compound. Specific examples of the binder resin include chlorinated polyethylene, polymethylmethacrylate, compolymers of methylmethacrylate and another (meth) acrylate alkyl ester, copolymers of vinyl chloride and acrylonitrile, and polyvinyl acetate. The binder resin may have reactive groups such as cationic polymerizable groups at its side chains or principle chains.

Relative to the entire composition of the photosensitive matter, the cationic polymerizable compound is 2% to 70% by weight, preferably 10% to 50% by weight, the radical polymerizable compound is 30% to 90% by weight, preferably 40% to 70% by weight, the radical photoinitiator is 0.3% to 8% by weight, preferably 1% to 5% by weight, and the cationic photoinitiator is 0.3% to 8% by weight, preferably 1% to 5% by weight.

The essential ingredients and optional ingredients of the photosensitive matter are mixed by, for instance, a high-speed mixer in a cool damp place after being blended with nothing or after being blended with ketone solvent such as methyl ethyl ketone, ester solvent such as ethyl acetate, aromatic solvent such as toluene and xylene, cellosolve solvent such as methyl cellosolve, alcohol solvent such as methanol, ether solvent such as tetrahydrofuran and dioxane, and halogen solvent such as dichloromethane and chloroform, if necessary.

The above photosensitive matter is coated by the same coating method as the photosensitive material (1) and dried, if necessary, thereby forming a recording layer composed of the aforementioned photosensitive matter. The coating thickness should be suitably selected. The suitable thickness of the film after dried is from 0.1 μm to 50 μm.

The recording layer made of the photosensitive material (2) is exposed to a light beam such as a laser beam (e.g. 300–1200 nm wavelength) from a normal holography exposure apparatus so as to polymerize the radical polymerizable compound, thereby recording interference fringes therein. According to this step, a hologram is given by diffracted light made of recorded interference fringes. However, the cationic polymerizable compound still remains in the pre-reacted state. To polymerize the cationic polymerizable compound, the recording layer is entirely exposed to a light beam (e.g. 200–700 nm wavelength) capable of activating the cationic photoinitiator, that is, the post exposure is conducted, thereby forming a hologram. It should be noted that the heat treatment or infra-red radiation treatment before the post exposure can change the diffraction efficiency, the peak wavelength of diffraction light, and the half bandwidth.

According to the present invention, the reconstruction wavelength of the volume hologram formed by using the above photosensitive materials (1), (2) may be, for instance, from 300 nm to 1,200 nm.

In the volume hologram multilayer structure of the present invention, when a volume hologram transfer foil made by using a thermo-sensitive adhesive agent as the adhesive layer 2 as will be described later so that the volume hologram layer is transferred to an adherend by hot pressing, the photosensitive material (2) is preferably used in terms of heat resistance in order to reduce the effect to the hologram image by the hot pressing. The photosensitive material (1) may be employed. The refractive index of the obtained volume hologram photosensitive material layer made of the above photosensitive materials (1), (2) is in a range from 1.4 to 1.6.

The volume hologram layer may contain particles having particle diameters from 350 nm to 1500 nm, preferably from 350 nm to 1000 nm. When the particle diameter of the particles exceeds 1500 nm, the hologram is not clearly shown and the recording property and coatability should be poor. The large-diameter particles may be organic resin particles such as polyethylene wax particles (refractive index of 1.52), MMA particles (refractive index of 1.49), polycarbonate particles (refractive index of 1.58), polystyrene particles (refractive index of 1.50), and polyacrylic styrene particles (refractive index of 1.57). It should be noted that inorganic particles may be used within a range not affecting the hologram image. Example of such inorganic particles include high refractive index particles such as $TiO_2$ (refractive index of 2.3–2.7), $Y_2O_3$ (refractive index of 1.87), $La_2O_3$ (refractive index of 1.95), $ZrO_2$ (refractive index of 2.05), $Al_2O_3$ (refractive index of 1.63), $CaCO_3$ (refractive index of 1.60), and $SiOx$ ($1.5 \leq x \leq 2.0$, refractive index of 1.35–1.48) and low refractive index particles such as LiF (refractive index of 1.4), $AgF_2$ (refractive index of 1.4), $3NaF.AlF_3$ (refractive index of 1.4), $AlF_3$ (refractive index of 1.4), $Na_3AlF_6$ (refractive index of 1.33), and $SiOx$ ($1.5 \leq x \leq 2.0$, refractive index of 1.35–1.48).

The large-diameter particles are selected such that the refractive index ratio ($n_F/n_H$) of the refractive index of the particles to the refractive index of the surrounding medium is at least not less than 1.05 or not greater than 0.95, preferably in a range from 1.05 to 1.8 or in a range from 0.75 to 0.95. When the refractive index ratio is greater than 0.95 and less than 1.05, the scattering strength should be poor and the counterfeit-proof property should be poor. When the refractive index ratio exceeds 1.8 or is less than 0.75, the hologram is not clearly shown. The large-diameter particles are dispersed in coating solution and the coating solution is applied to form a volume hologram layer. The adding amount of the large-diameter particles is from 1% by weight to 20% by weight, preferably from 1% by weight to 10% by weight relative to the photosensitive material such that the haze value is from 5% to 15%. When the adding amount is too much or the haze value is too high, there is difficulty in hologram recording, the obtained hologram is not clearly shown, and there is difficulty in film forming.

The transparent surface protective layer 3 is a transparent resin coating layer. The transparent resin may be a thermoplastic resin, an ionizing radiation curable resin, a thermosetting resin, or the like. Examples of thermoplastic resin include methacrylic resins such as polymethacrylate, polyacrylic acid ester resins, polyvinyl chloride resins, cellulose resins, silicone resins, chlorinated rubber, and casein. Ionizing radiation curable resins are categorized into electron beam-curable resins and ultraviolet-curable resins. The ultraviolet-curable resins have the same components of the electron beam-curable resins, except that the ultraviolet-curable resin further contents a photoinitiator and a photosensitizer. Generally, the ionizing radiation curable resin contains, as its main component, monomer, oligomer, or polymer having radical polymerizable active groups as its film-forming component. The monomer may be a derivative of (meth)acrylic acid ester, and the oligomer or polymer may be of an urethane acrylate or of a polyester acrylate. To make ultraviolet-curable resins, a photoinitiator and a photosensitizer are added to, for instance, the aforementioned monomer having radical polymerizable active groups. Examples of the photoinitiator are acetophenones, benzophenones, Michler's benzoyl benzoates, α-amyloxime esters, tetramethylthiuram monosulfides, and thioxanthones. Examples of the photosensitizer include n-butylamine, triethylamine, and tri-n-butylphosphine. The refractive index of the transparent resin is in a range from 1.4 to 1.6.

The particle diameter of particles dispersed in the transparent surface protective layer 3 may be from 350 nm to 5000 nm, preferably from 350 nm to 1500 nm. When the particle diameter of the particles exceeds 5000 nm, the hologram is not clearly shown and coatability should be poor. The particles may be such inorganic particles having high refractive index such as $TiO_2$ (refractive index of 2.3–2.7), $Y_2O_3$ (refractive index of 1.87), $La_2O_3$ (refractive index of 1.95), $ZrO_2$ (refractive index of 2.05), $Al_2O_3$ (refractive index of 1.63), and $SiOx$ ($1.5 \leq x \leq 2.0$, refractive index of 1.35–1.48) and may be organic resin particles such as polyethylene wax particles (refractive index of 1.52), and may be inorganic particles having low refractive index such as LiF (refractive index of 1.4), $AgF_2$ (refractive index of 1.4), $3NaF.AlF_3$ (refractive index of 1.4), $AlF_3$ (refractive index of 1.4), $Na_3AlF_6$ (refractive index of 1.33), and $SiOx$ ($1.5 \leq x \leq 2.0$, refractive index of 1.35–1.48).

The large-diameter particles are selected such that the refractive index ratio ($n_F/n_P$) of the refractive index of the particles to the refractive index of the transparent resin is at least not less than 1.05 or not greater than 0.95, preferably in a range from 1.05 to 1.8 or in a range from 0.75 to 0.95. When the refractive index ratio is greater than 0.95 and less than 1.05, the scattering strength should be poor and the counterfeit-proof property should be poor. When the refractive index ratio exceeds 1.8 or is less than 0.75, the hologram is not clearly shown.

The adding amount of the large-diameter particles to the transparent surface protective layer is from 1% by weight to 50% by weight, preferably from 1% by weight to 30% by weight, and the haze value is from 5% to 15%. When the adding amount is too much or the haze value is too high, the obtained hologram is not clearly shown, and there is difficulty in film forming.

As will be described in detail with regard to the second counterfeit-proof volume hologram multilayer structure, the refractive index ratio ($n_P/n_H$) wherein $n_P$ is the refractive index of the transparent surface protective layer and $n_H$ is the refractive index of the volume hologram layer is set to be not less than 1.08, thereby obtaining excellent counterfeit-proof performance. To make the refractive index of the transparent surface protective layer to be greater than the refractive index of the volume hologram layer, a transparent resin having a refractive index greater than that of the photosensitive material is selected or, alternatively, particles having small diameter not greater than 350 nm and having high refractive index are added to increase the refractive index. The total content of the large-diameter and small-diameter particles is from 1% by weight to 300% by weight, preferably from 1% by weight to 200% by weight.

In terms of counterfeit prevention, pigments and/or dyes having light absorption relative to visible light of 480 nm to 550 nm wavelength may be added into the transparent surface protective layer so as to colorize the transparent surface protective layer, within the range not affecting the transparency. The pigments and the dyes may be used alone or in admixture. Even when the transparent surface protective layer is colorized, the replication of hologram is still allowed in theory. However, the colorized transparent surface protective layer takes much time to replicate the hologram and makes the replication difficult. Examples of usable pigments are black pigments such as carbon black, copper-iron-manganese, and aniline black, and other color pigments such as naphthol red F5RK and phthalocyanine blue. Examples of usable dyes are black dyes such as Acid Black, Chrome Black and Reactive Black, and dyes such as Disperse Red, Cationic Blue and Cationic Yellow, which may be used alone or in admixture. The amount of the pigment or dye incorporated in the transparent surface protective layer should be 0.1% by weight to 5% by weight.

Various additives may be suitably added to the transparent surface protective layer in order to impart functions such as hard coatability, printability, and slip capability. Such additive may double as the particles to get the predetermined refractive index ratios among the large-diameter particles and the layers. In terms of coatability, surface active agent may be added.

The transparent resin and the particles are dispersed in a solvent and mixed to obtain coating solution. The coating solution is applied to the substrate 5 and dried or cured. After that, the tackiness of the volume hologram layer is utilized, thereby forming the transparent surface protective layer. The cure of the ionizing radiation curable resin is conducted as follows. That is, in case of electron beam irradiation, an electron beam of 50–1000 KeV, preferably 100–300 KeV is irradiated for 0.1–100 Mrad, preferably 1–10 Mrad by using an electron beam acceleration machine of Cockcroft Walton type. In case of ultraviolet light irradiation, an ultraviolet light is irradiated for 01.–10000 mJ/cm$^2$, preferably 10–1000 mJ/cm$^2$ from a light source such as a super high pressure mercury lamp. The coating thickness of the transparent surface layer after dried is from 0.1 $\mu$m to 10 $\mu$m, preferably 0.5 $\mu$m to 5 $\mu$m.

Because the substrate 5 is released off after the volume hologram is transferred to the adherend, the surface on which the substrate 5 is laminated may be subjected to a releasing treatment or the substrate 5 is released off by utilizing the releasing property of the transparent surface protective layer 3. If necessary, the substrate 5 may remain stuck even after the accomplishment of the hologram seal.

Examples of the substrate 5 include polyethylene films, polypropylene films, polyethylene fluoride films, polyvinylidene fluoride films, polyvinyl chloride films, polyvinylidene chloride films, ethylene-vinyl alcohol films, polyvinyl alcohol films, polymethyl methacrylate films, polyether sulfone films, polyether ether ketone films, polyamide films, tetrafluoroethylene-perfluoroalkylvinyl ether copolymer films, polyethylene terephthalate films, and polyimide films. The thickness is 2 $\mu$m to 200 $\mu$m, preferably 10 $\mu$m to 50 $\mu$m. The substrate may take a form of an opaque film kneaded with a shielding pigment such as carbon black, so that the hologram layer can be protected just before use, and the substrate can be released off without forgetting.

Now, the adhesive layer 2 will be described. The first through fourth counterfeit-proof volume hologram multilayer structures of the present invention may take a form of volume hologram transfer foil and a form of volume hologram label. In case of the volume hologram transfer foil, the adhesive layer 2 should be an adhesive layer made of heat-sensitive adhesive (hereinafter, "heat-sensitive adhesive layer"). In case of the volume hologram transfer label, the adhesive layer 2 should be an adhesive layer made of pressure-sensitive adhesive (hereinafter, "pressure-sensitive adhesive layer"). In case of the volume hologram transfer foil, the total thickness of the volume hologram transfer foil after the release sheet 6 is released off is from 1 $\mu$m to 10 $\mu$m. In case of the volume hologram transfer label, the total thickness of the volume hologram transfer foil is from 10 $\mu$m to 50 $\mu$m.

Examples of the heat-sensitive adhesive include ethylene-vinyl acetate copolymer resins, polyamide resins, polyester resins, polyethylene resins, ethylene-isobutyl acrylate copolymer resins, butyral resins, polyvinyl acetate resins and their copolymer resins, cellulose derivatives, polymethyl methacrylate resins, polyvinyl ether resins, polyurethane resins, polycarbonate resins, polypropylene resins, epoxy resins, phenol resins, thermoplastic elastomers such as SBS, SIS, SEBS, SEPS, and reactive hot melt resins. The adhesive should be suitably selected in terms of the adhesion property relative to the adherend and should have refractive index from 1.45 to 1.46.

Examples of the adherend as an object to which the multilayer structure is attached include a polyvinyl chloride sheet, a polystyrene sheet, a PET sheet and a high-quality paper sheet. In view of adhesion to these sheets, usable heat-sensitive adhesives are commercially available adhesives such as "V200" (softening point of 85° C.), "Ev270" (softening point of 41° C.) and "V100" (softening point of 67° C.), all available from Mitsui Chemicals, Inc., "AD1790-15" (softening point of 80° C.) available from Toyo Morton Co., Ltd., "U206" (softening point of 60° C.)available from Soken Kaqaku Co., Ltd., "EC1200" (softening point of 75° C.), "EC1700" (softening point of 85° C.), "AC3100" (softening point of 90° C.) and "EC909" (softening point of 100° C.), all available from Chuo Rika Kogyo Co., Ltd., "Nipporan 3038" (softening point of 135° C.) available from Nippon Polyurethane Co., Ltd., "M-720AH", "A-928", "A-450" and "A-100z-4", all available from Dai Nippon Ink Co., Ltd.

The large-diameter particles may be dispersed into the heat-sensitive adhesive layer. However, since the effect of the large-diameter particles for counterfeit prevention is attained by the aforementioned forward scattering, it is effective in case of a type (3) in which a heat-sensitive adhesive layer, a coloring agent layer, and a heat-sensitive adhesive layer are laminated in this order and using a light reflecting layer as a background color. The large-diameter particles may be any of the examples listed with regard to the transparent surface protective layer and are preferably selected such that the refractive index ratio ($n_F/n_A$) of the refractive index of the particles to the refractive index of the surrounding adhesive is at least not less than 1.05 or not greater than 0.95. The adding amount of the large-diameter particles into the adhesive layer is from 1% by weight to 50% by weight, preferably from 1% by weight to 30% by weight relative to the adhesive such that the haze value is from 5% to 15%. When the adding amount is too much, the adhesion property may be poor and there is difficulty in film forming.

As will be described in detail with regard to the second counterfeit-proof volume hologram multilayer structure, the refractive index ratio ($n_H/n_A$) wherein $n_A$ is the refractive index of the adhesive layer and $n_H$ is the refractive index of the volume hologram layer is set to be not less than 1.08, thereby obtaining excellent counterfeit-proof performance. To make the refractive index of the adhesive layer to be smaller than the refractive index of the volume hologram layer, an adhesive having a refractive index smaller than that of the photosensitive material is selected or, alternatively, particles having small diameter not greater than 350 nm and having low refractive index are added into the adhesive layer to lower the refractive index. The content of the large-diameter and small-diameter particles is from 1% by weight to 300% by weight, preferably from 1% by weight to 200% by weight in total.

The heat-sensitive adhesive is dissolved or dispersed in a solvent such as water, toluene or methyl ethyl ketone to prepare a coating solution. Then, the coating solution is coated on a release sheet 6 to have a post-drying thickness of 2 to 10 μm by means of a comma coater, a die coater or a gravure coater. After that, the obtained layer is transferred to the volume hologram layer by hot pressing, thereby forming the heat-sensitive adhesive layer.

The heat-sensitive adhesive layer may be colorless and transparent. However, the multilayer structure may be composed of (1) a colored heat-sensitive adhesive layer, (2) a lamination of a coloring agent layer and a heat-sensitive adhesive layer, or (3) a lamination of a heat-sensitive adhesive layer, a coloring agent layer, and a heat-sensitive adhesive layer.

When the heat-sensitive adhesive layer is (1) i.e. the colored heat-sensitive adhesive layer, the adhesive layer functions as background of the hologram image so as to provide a hologram image of enhanced contrast. As the coloring agent, pigments and dyes may be used alone or in admixture. Examples of pigments are black pigments such as carbon black, copper-iron-manganese and Aniline Black, other colored pigments such as Naphtol Red F5RK and Phthalocyanine Blue, and infrared reflecting pigments, which may be used alone or in admixture. When a colored infrared reflecting pigment is used as the pigment, the back layer in the hologram recording layer can be placed in a state different from visible light. Examples of dyes include black dyes such as Acid Black, Chrome Black and Reactive Black, and dyes such as Disperse Red, Cationic Blue and Cationic Yellow, which may be used alone or in admixture.

The amount of the pigment or dye incorporated in the heat-sensitive adhesive layer should be 1% by weight to 40% by weight, preferably 10% by weight to 30% by weight. An amount exceeding 40% by weight is not preferable because the heat adhesion property should be poor. The colored heat-sensitive adhesive layer should have an O.D. value of 1.5 or more, preferably 1.9 or more, and absorb 50% or more, preferably 80% or more, of transmitted light, so that a hologram image of enhanced contrast can be obtained.

The colored heat-sensitive adhesive layer is provided on the volume hologram layer by dissolving or dispersing the pigment or dye together with the adhesive in a solvent such as ethyl acetate, toluene or methyl ethyl ketone, coating the resulting solution on a releasing film to have a post-drying thickness of 0.5 μm to 100 μm, preferably 1 μm to 50 μm by means of a comma coater, a die coater, a gravure coater or the like, and transferring the thus obtained layer onto the volume hologram layer by hot pressing.

The adhesive layer may be (2), i.e. a lamination of a coloring agent layer and a heat-sensitive adhesive layer. In this case, the coloring agent layer is an ink layer made of a binder and a coloring agent. There is no limitation of selecting the binder so that any binder having adhesion property between the hologram layer and the heat-sensitive adhesive layer may be employed. Examples of the binder include a polyurethane resin, polyester resins, polyacrylic resins, vinyl chloride resins, vinyl acetate resins, vinyl chloride-vinyl acetate copolymer resins, polyolefin resins, ethylene-vinyl acetate copolymer resins, styrene-butadiene copolymer resins, and polyamide resins. As the coloring agent in the coloring agent layer, the aforesaid pigments or dyes may be used alone or in admixture. The content of the pigment or dye in the coloring agent layer is 1% by weight to 40% by weight and preferably 10% by weight to 30% by weight, and is larger than that in the colored heat-sensitive adhesive layer. The coloring agent layer should preferably have an O.D. value of 1.5 or more, preferably 1.9 or more, and absorb 50% or more, preferably 80% or more, of transmitted light, so that a hologram image of having excellent contrast can be obtained. To obtain the coloring agent layer, the pigment or dye is dispersed in a binder to form an ink. Then, the ink is coated directly on the heat-sensitive adhesive layer to have a post-drying thickness of 0.5 μm to 100 μm and preferably 1 μm to 50 μm by means of a comma coater, a die coater or a gravure coater. In case of the heat-sensitive adhesive layer of a lamination of a coloring agent layer and a heat-sensitive adhesive layer, a heat-sensitive adhesive layer and a coloring agent layer are formed on a release sheet 6 and the thus formed layers are transferred together with the release sheet onto the volume hologram layer by hot pressing such that the coloring agent layer side meets the volume hologram layer.

In case of (3), i.e. a lamination of a heat-sensitive adhesive layer/a coloring agent layer/a heat-sensitive adhesive layer, the coloring agent layer may be a light reflecting film made of aluminum, silver, gold or the like or an ink layer as mentioned above. A heat-sensitive adhesive layer, a coloring agent layer, and a heat-sensitive adhesive layer are formed on a release sheet 6 and the thus formed layers are transferred together with the release sheet onto the hologram layer by hot pressing such that the heat-sensitive adhesive layer side is directly in contact with the hologram layer.

In case that the adhesive layer is a pressure-sensitive adhesive layer, examples of usable pressure-sensitive adhesive include acrylic resins, acrylate ester resins, and the copolymers thereof, styrene-butadiene copolymers, natural rubber, casein, gelatin, rosin ester, terpene resins, phenol resins, styrene resins, coumaron-indene resins, polyvinyl ether, and silicone resins. In addition, examples include alpha-cyanoacrylate adhesives, silicone adhesives, maleimide adhesives, styrol adhesives, polyolefin adhesives, resorcinol adhesives, and polyvinyl ether adhesives. The adhesive should have a refractive index from 1.42 to 1.46. Examples of the adherend as an object to which the multilayer structure is attached include a polyvinyl chloride sheet, a polystyrene sheet, a PET sheet and a high-quality paper sheet. The adding amount and the refractive index of large-diameter particles into the pressure-sensitive adhesive layer are the same as those of the heat-sensitive adhesive layer.

The pressure-sensitive adhesive is dissolved or dispersed in a solvent such as ethyl acetate, toluene, methyl ethyl ketone or butyl acetate to prepare a coating solution. Then, the coating solution is coated on a suitable release sheet to have a post-drying thickness of 0.5 μm to 20 μm. After that, the obtained layer is transferred together with the release sheet to the volume hologram layer by lamination, thereby forming the pressure-sensitive adhesive layer. The pressure-sensitive adhesive layer may be colorless and transparent. However, the multilayer structure may be composed of (1), (2), or (3) in which the pressure-sensitive adhesive layer is substituted for the heat-sensitive adhesive layer.

The coloring agent layer may be a colored pressure-sensitive adhesive layer, a printed layer, a light reflecting metal film made of aluminum, silver, gold or the like, or a colored resin film. The colored pressure-sensitive adhesive layer may be made of a transparent pressure-sensitive adhesive containing pigments and/or dyes which may be alone or in admixture. The usable pigments and dyes may be any of the examples listed with regard to the heat-sensitive adhesive layer. The content of the pigment or dye in the pressure-sensitive adhesive layer should be 1% by weight to 40% by weight, preferably 10% by weight to 30% by weight. The coating for forming the colored pressure-sensitive adhesive layer is conducted to have a thickness from 1 µm to 100 µm, preferably from 5 µm to 30 µm. The colored pressure-sensitive adhesive layer should have an O.D. value of 1.5 or more, preferably 1.9 or more, and absorb 50% or more, preferably 80% or more, of transmitted light, so that a hologram image of enhanced contrast can be obtained. The printed layer may be a layer which comprises a solidly printed area with a printing ink and/or a character pattern area, and can be transferred singly on the adhesive layer. The colored resin film may be a colored resin film comprising a transparent plastic film with a coloring agent incorporated therein, and a transparent plastic film with a colored layer provided thereon.

The release sheet 6 is just for protecting the adhesive layer until the volume hologram multilayer structure is applied to the adherend. Examples of film as the release sheet include polyethylene films, polypropylene films, polyethylene fluoride films, polyvinylidene fluoride films, polyvinyl chloride films, polyvinylidene chloride films, ethylene-vinyl alcohol films, polyvinyl alcohol films, polymethyl methacrylate films, polyether sulfone films, polyether ether ketone films, polyamide films, tetrafluoroethylene-perfluoroalkylvinyl ether copolymer films, polyethylene terephthalate films, polyimide films, and release coated paper. The thickness of the release sheet 6 is from 2 µm to 200 µm, preferably from 10 µm to 50 µm. The release sheet is preferably treated with a fluorine-base or silicone-base releasing agent. The release sheet may also be formed of a transparent film or an opaque film kneaded with a shielding pigment such as carbon black, which may be in a sheet or roll form.

Hereinafter, the second counterfeit-proof volume hologram multilayer structure of the present invention will be described with reference to FIG. 1(a). In the counterfeit-proof volume hologram multilayer structure, the counterfeit prevention is achieved by differences in refractive index between layers, without adding large-diameter particles.

Figure 3:
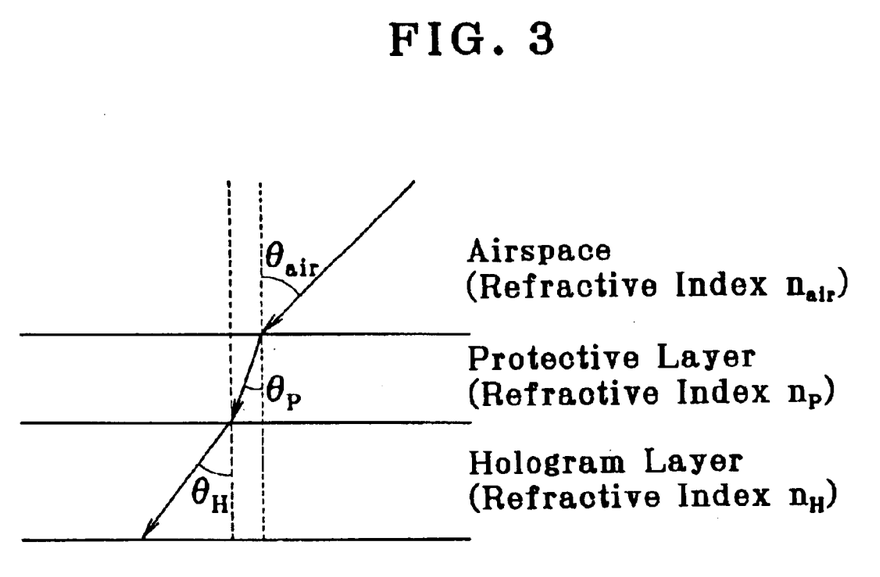
FIG. 3 is a schematic diagram of a read-out beam incident on the multilayer structure comprising a transparent surface protective layer and a volume hologram layer.

To prevent replication, it is required that the interlayer reflectance of a read-out beam is 2% or more, preferably 5% or more. In a multilayer structure of airspace, a transparent surface protective layer, and a volume hologram layer, it is assumed that the angle of the read-out beam for reading the volume hologram is 20–60°. Snell's law:

$$n_{air} \sin \theta_{air} = n_P \sin \theta_P = n_H \sin \theta_H \quad (1)$$

wherein $n_{air}$ is the refractive index of the airspace, $n_P$ is the refractive index of the transparent surface protective layer, and $n_H$ is the refractive index of the volume hologram layer. In the range of $20 \leq \theta \leq 60$ in the above (1), the minimum $n_P/n_H$ is given when $\theta=60°$. Since the minimum reflectance is given when the light is polarized by the refraction P, the minimum value is defined as the refractive index meeting this condition. The energy reflectance at refraction P is obtained by Fresnel's law:

$$R_P = \tan^2(\theta_P - \theta_H)/\tan^2(\theta_P + \theta_H) \quad (2)$$

When $R_P=0.02$ and $\theta_P=60°$, $\theta_H=69.3°$ so that $n_P/n_H=1.08$ is obtained from the equation (1).

It is found from the above that the refractive index ratio ($n_P/n_H$) between the transparent surface protective layer and the volume hologram layer is set to at least 1.08, thereby making a volume hologram which is hardly replicated. To obtain an interlayer reflectance of 5% or more, the refractive index ratio ($n_P/n_H$) should be 1.11 or more as a result of the calculation, thereby making a volume hologram which is further hardly replicated.

When the refractive index ratio between layers is less than 1.08, the interlayer reflectance is low, that is, the counterfeit prevention is poor. When the refractive index ratio is less than 1, that is, the refractive index of the transparent surface protective layer is smaller than the refractive index of the volume hologram layer, $n_P/n_H$ not greater than 0.4 is required to obtain a reflectance of the read-out beam of 2% or more when the incident angle is 60° ($\theta_P=60$). This is unrealistic.

According to the second counterfeit-proof volume hologram multilayer structure, the transparent surface protective layer, the volume hologram layer, and the adhesive layer as described with regard to the first counterfeit-proof volume hologram multilayer structure are set such that at least either the refractive index ratio ($n_P/n_H$) between the transparent surface protective layer and the volume hologram layer or the refractive index ratio ($n_H/n_A$) between the volume hologram layer and the adhesive layer is set to be not less than 1.08, wherein $n_P$ is the refractive index of the transparent surface protective layer and $n_H$ is the refractive index of the volume hologram layer and $n_A$ is the refractive index of the adhesive layer. In addition, the refractive index ratio is required to be smaller than the refractive index at which the total reflection is occurred. Just for reference, the ratio is 1.15 when $\theta_P=60$, the ratio is 1.30 when $\theta_P=50$, and the ratio is 1.55 when $\theta_P=40$. Especially, when the refractive index ratio ($n_P/n_H$) between the transparent surface protective layer and the volume hologram layer is greater than the refractive index ratio at which the total reflection is occurred, the hologram can not be clearly shown. It is not preferable.

The second counterfeit-proof volume hologram multilayer structure is obtained by controlling the refractive index ratio between two of the transparent surface protective layer, the volume hologram layer, and the adhesive layer as described in the first counterfeit-proof volume hologram multilayer structure. The materials and the laminating methods of the respective layers of the second counterfeit-proof volume hologram multilayer structure are the same as those of the first counterfeit-proof volume hologram multilayer structure except that particles having particle diameter of 350 nm or more are not dispersed. As apparent from the view of the counterfeit prevention, it is enough that either one of the refractive index ratios between the transparent surface protective layer and the volume hologram layer and between the volume hologram layer and the adhesive layer is controlled to be 1.08 or more. It is preferable to control the refractive index ratio between the transparent surface protective layer and the volume hologram layer. In this case, the other interlayer refractive index ratio may be 1 or less.

Hereinafter, the third counterfeit-proof volume hologram multilayer structure will be described with reference to FIG. 1(b).

The third counterfeit-proof volume hologram multilayer structure is different from the first counterfeit-proof volume hologram multilayer structure in that a transparent surface protective layer 4 composed of a transparent surface protective film is laminated on a volume hologram layer 1 via a first adhesive layer 2'. However, the volume hologram layer 1, a second adhesive layer 2, and a release sheet 6 of the third counterfeit-proof volume hologram multilayer structure are the same as the volume hologram layer 1, the adhesive layer 2, and the release sheet 3 of the first counterfeit-proof volume hologram multilayer structure.

In the third counterfeit-proof volume hologram multilayer structure, particles having particle diameter of 350 nm or more are dispersed in at least one of the transparent surface protective layer composed of a transparent surface protective film, the first adhesive layer, the volume hologram layer, and the second adhesive layer, and the refractive index ratio ($n_F/n_B$) is set to be not less than 1.05 or not greater than 0.95, wherein $n_F$ is the refractive index of the particles and $n_B$ is the refractive index of a medium in which the particles are dispersed.

The first adhesive layer 2' is required to have transparency in terms of observation of hologram. The aforementioned heat-sensitive adhesive or pressure-sensitive adhesive may be used to form the first adhesive layer 2'. The first adhesive layer 2' is not necessary when the transparent surface protective film 4 and the volume hologram layer 1 have adhesion properties to each other. When particles are not dispersed into the transparent surface protective film, the first adhesive layer 2' is preferably disposed and particles having particle diameter of 350 nm or more are preferably dispersed in the first adhesive layer 2'. Material usable for the first adhesive layer 2' may be heat-sensitive adhesives and pressure-sensitive adhesives and is preferably suitably selected in terms of the adhesiveness between the volume hologram layer and the transparent surface protective film. Similar to the aforementioned heat-sensitive adhesive layer of the first counterfeit-proof volume hologram multilayer structure, it is preferable to disperse particles having particle diameter of 350 nm or more into the first adhesive layer 2' in terms of counterfeit prevention. The particles are preferably selected such that the refractive index ratio ($n_F/n_A$) of the refractive index of the particles to the refractive index of the surrounding medium (adhesive) is at least not less than 1.05 or not greater than 0.95. The adding amount of the large-diameter particles into the adhesive layer is from 1% by weight to 50% by weight, preferably from 1% by weight to 30% by weight such that the haze value is from 5% to 15%. When the adding amount is too much or the haze value is too high, the hologram can not be clearly shown and there is difficulty in film forming.

As will be described in detail with regard to the fourth counterfeit-proof volume hologram multilayer structure, the refractive index ratio ($n_{A1}/n_H$) wherein $n_{A1}$ is the refractive index of the first adhesive layer 2' and $n_H$ is the refractive index of the volume hologram layer is set to be not less than 1.08, thereby obtaining a hologram with excellent reflexivity and excellent counterfeit prevention. To make the refractive index of the first adhesive layer 2' to be larger than the refractive index of the volume hologram layer, an adhesive having a refractive index larger than that of the photosensitive material is selected or, alternatively, particles having small diameter not greater than 350 nm and having high refractive index are added into the layer to increase the refractive index of the first adhesive layer. The total content of the large-diameter and small-diameter particles is in the range as mentioned above.

The first adhesive layer 2' is formed as follows. The coating on the transparent surface protective film 4 is conducted in the same manner as the adhesive layer 2 to have a post-drying thickness 0.5 $\mu$m to 2 $\mu$m. After that, the obtained layer is transferred with the transparent surface protective film 4 onto the volume hologram layer by hot pressing, thereby forming the heat-sensitive adhesive layer.

Examples of the transparent surface protective film 4 include polyethylene films, polypropylene films, polyethylene fluoride films, polyvinylidene fluoride films, polyvinyl chloride films, polyvinylidene chloride films, ethylene-vinyl alcohol films, polyvinyl alcohol films, polymethyl methacrylate films, polyether sulfone films, polyether ketone films, polyamide films, tetrafluoroethylene-perfluoroalkylvinyl ether copolymer films, polyethylene terephthalate films, and polyimide films. The thickness is 2 $\mu$m to 200 $\mu$m, preferably 10 $\mu$m to 50 $\mu$m. Plastic films having a refractive index in a range from 1.4 to 1.6 are usable. In terms of counterfeit prevention, coloring agents and/or large-diameter particles may be added into the plastic film so as to colorize the transparent surface protective layer. In this case, a film is formed by dispersing the coloring agents and/or large-diameter particles into molten plastic and by extrusion-molding the molten plastic or is made by using resin solution in which large-diameter particles are dispersed.

The large-diameter particles may be particles as described with regard to the transparent surface protective layer. The content of the large-diameter particles in the plastic film is from 1% by weight to 50% by weight, preferably from 1% by weight to 30% by weight such that the haze value is from 5% to 15%. When the content of the particles or the haze value is too high, there is a problem that the hologram can not be clearly shown. The refractive index of the transparent surface protective film in which the large-diameter particles are dispersed is in a range from 1.4 to 2.2.

The transparent surface protective film is for protecting the volume hologram layer and the surface of the transparent surface protective film is preferably treated with corona or flame to increase adhesive grade or an adhesive layer made of an acid-converted polyester resin is preferably attached to the surface. If required, the outer surface of the transparent surface protective film may be subjected to a hard coat treatment. To this end, for instance, a silicone hard coat, a fluorine-containing hard coat, a melamine alkyl hard coat, or an urethane-acrylate hard coat (of the ultraviolet curing type) of 1 $\mu$m to 50 $\mu$m in thickness may be applied on the transparent surface protective film by dipping, spraying, roll coating or the like. The surface of the surface protective film which has been subjected to the hard coat treatment may be subjected to the release treatment in order to prevent the surface protective film from being released by sticking another film thereon, thereby preventing counterfeit. The release treatment may be carried out by the dipping coating, spray coating, and roll coating of a fluorine release agent, a silicone release agent, a stearate release agent, and a wax release agent.

Now, the fourth counterfeit-proof volume hologram multilayer structure of the present invention will be described. The fourth counterfeit-proof volume hologram multilayer structure is similar to the third counterfeit-proof volume hologram, but is different from the third counterfeit-proof volume hologram in that the counterfeit prevention is achieved by differences in refractive index between layers, without adding large-diameter particles. To prevent replication, it is required that the interlayer reflectance of a read-out beam is 2% or more, preferably 5% or more.

For this, in the fourth counterfeit-proof volume hologram multilayer structure, the layers as described with regard to the third counterfeit-proof volume hologram multilayer structure are set such that at least one of the refractive index ratio ($n_P/n_{A1}$) between the transparent surface protective layer and the first adhesive layer, the refractive index ratio ($n_{A1}/n_H$) between the first adhesive layer and the volume hologram layer, and the refractive index ratio ($n_H/n_{A2}$) between the volume hologram layer and the second adhesive layer is set to be not less than 1.08, wherein $n_P$ is the refractive index of the transparent surface protective layer, $n_{A1}$ is the refractive index of the first adhesive layer, $n_H$ is the refractive index of the volume hologram layer, $n_{A2}$ is the refractive index of the second adhesive layer.

The fourth counterfeit-proof volume hologram multilayer structure is obtained by controlling the refractive index ratio between two of the transparent surface protective layer, the first adhesive layer, the volume hologram layer, and the second adhesive layer as described with regard to the third counterfeit-proof volume hologram multilayer structure. The materials and the laminating methods of the respective layers of the fourth counterfeit-proof volume hologram multilayer structure are the same as those of the third counterfeit-proof volume hologram multilayer structure except that particles having particle diameter of 350 nm or more are not dispersed. In terms of the counterfeit prevention, the refractive index ratio between layers is set to be not less than 1.08 and is preferably less than the refractive index ratio at which the total reflection is occurred. In addition, it is enough that either one of the refractive index ratios between the transparent surface protective layer and the first adhesive layer, between the first adhesive layer and the volume hologram layer, and between the volume hologram layer and the second adhesive layer is controlled to the desired value. It is preferable to control the refractive index ratio between the transparent surface protective layer and the first adhesive layer or between the first adhesive layer and the volume hologram layer. In this case, the other interlayer refractive index ratios may be 1 or less. The reason for the limitation on the refractive index ratio between layers is the same as that as described with regard to the second counterfeit-proof volume hologram multilayer structure.

The following is an example of the manufacturing method of the first/second counterfeit-proof volume hologram multilayer structure:
(1) a first multilayer structure of a release film/a hologram-recording medium layer/a release film;
(2) a second multilayer structure of a substrate/a transparent surface protective layer; and
(3) a third multilayer structure of an adhesive layer/a release sheet are prepared separately.

First, a hologram is recorded in the hologram-recording medium layer in the first multilayer structure, followed by a heat treatment. Then, one of the release films of the volume hologram layer is released to expose a surface. The second multilayer structure is laminated on the first multilayer structure such that the transparent surface protective layer meets the exposed surface to make a multilayer structure comprising the substrate/the transparent surface protective layer/the volume hologram layer/the release film. This structure is irradiated with ultraviolet rays for the fixation of the volume hologram. After that, the other release film of the volume hologram layer is released to expose a surface and the third multilayer structure is laminated on the structure such that the adhesive layer meets the exposed surface, thereby manufacturing a volume hologram multilayer structure composed of the substrate/the transparent surface protective layer/the volume hologram layer/the adhesive layer/the release layer.

The following is an example of the manufacturing method of the third/fourth counterfeit-proof volume hologram multilayer structure:
(1) a first multilayer structure of a release film/a hologram-recording medium layer/a release film;
(2) a second multilayer structure of a transparent surface protective film/a first adhesive layer; and
(3) a third multilayer structure of a second adhesive layer/a release sheet are prepared separately.

First, a hologram is recorded in the hologram-recording medium layer in the first multilayer structure, followed by a heat treatment and irradiation with ultraviolet rays. After that, one of the release films of the volume hologram layer is released to expose a surface. The second multilayer structure is laminated on the first multilayer structure such that the first adhesive layer meets the exposed surface to make a multilayer structure comprising the transparent surface protective film/the first adhesive layer/the volume hologram layer/the release film. Then, the other release film of the volume hologram layer is released to exposed a surface and the third multilayer structure is laminated on the structure such that the second adhesive layer meets the exposed surface, thereby manufacturing a volume hologram multilayer structure composed of the transparent surface protective film/the first adhesive layer/the volume hologram layer/the second adhesive layer/the release sheet.

It is preferable that the counterfeit-proof volume hologram multilayer structure of the present invention has been cut in conformity to the shape of an adherend or a corresponding part of the adherend. When the counterfeit-proof volume hologram multilayer structure is provided with the release sheet, it is preferable to provide cutouts in portions of the structure other than the release sheet. This is because individual labels of given shape can be taken out of the structure of large size or in a rolled-up to correspond to articles as adherends. Such cutting may be formed in the structure except the release sheet by vertically moving a blade in a stroke corresponding to the thickness of the structure minus the thickness of the release sheet. It is also allowed to remove respective layers other than the release sheet between adjacent labels, leaving individual labels of given shape. In this case, the release sheet may be provided at its boundaries with perforations along which individual labels are detachable.

Figure 2B:
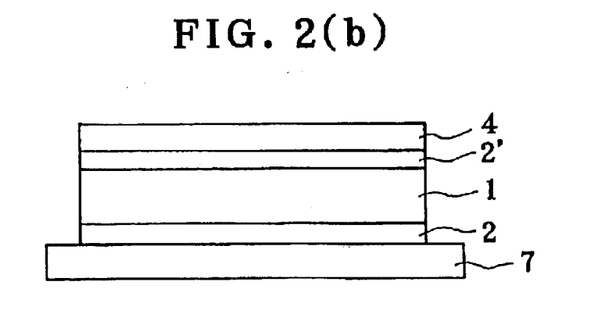
FIG. 2(b) is a sectional view of a third/fourth counterfeit-proof volume hologram seal of the present invention, for explaining the volume hologram seal.

FIGS. 2(a), 2(b) are sectional views each showing an example of a counterfeit-proof volume hologram seal. Shown in FIG. 2(a) is a first/second counterfeit-proof volume hologram seal which is produced by using the first/second counterfeit-proof volume hologram multilayer structure. Shown in FIG. 2(b) is a third/fourth counterfeit-proof volume hologram seal which is produced by using the third/fourth counterfeit-proof volume hologram multilayer structure. In these drawings, numeral 7 is an adherend and other numerals are the same as those in FIGS. 1(a), 1(b).

The adherend may be a film or sheet of paper, synthetic paper, synthetic resin or metal. It may take a sheet form such as an examination admission ticket, a card form such as an ID card, or a booklet form such as a passport. If the adherend has a photograph attached thereon, the photograph should be attached with adhesive such as paste having an adhesion with which the photograph cannot be detached from the adherend, and so may be generally available starch paste or synthetic paste. In case of a photograph forming a part of the adherend, the photograph may be a known photographic material represented by silver salt, a sublimation transfer image or the like. The photograph may be not only an image indicating a face but also an image indicating a finger print or palm print for identifying an individual. When, for instance, the certificate is an admission certificate for a sport event or the like, monochromatic or polychromatic numerals and/or characters may be indicated on the information area of the certificate by means of printing, a thermal head or an ink jet. Furthermore, the name of the site, whether or not the individual who carries the certificate is a player, qualifications, and sponsor's instructions may be indicated on the information area.

The refractive indexes of the present invention were measured by using the following device according to JIS (Japanese Industrial Standard) K7142 (a method of measuring refractive index of plastics).

Used device: Multi-wavelength Abbe refractometer DR-2M (manufactured by Atago Co., Ltd.)

Interference filter: 486 nm

Intermediate solution: monobromonaphthalene, $n_{25}$= 1.657 (at a wavelength of 587 nm)

Glass material: S-LAL14 available from Ohara Co., Ltd. $n_{25}$=1.6968 (at a wavelength of 587 nm) size: 20×8×3 mm Processing: 20×8 one surface conventional optical polishing (surface to be measured)

8×3 one surface polishing(surface roughness: 6.3 μmRa or less, lighting surface)

square 0.5 C total perimeter 0.3 C chamfering

The particle size was measured by a Microtrac Ultra Fine Particle Analyzer (Leeds and Northrup) at a 50% mean particle diameter.

The haze value was measured by HAZE Meter NDH2000 (Nippon Denshoku Industries Co., Ltd.) according to the JIS K7136.

The present invention is now explained more specifically with reference to examples. It should be noted that the read-out angle was set to 50° for all of volume holograms of the following respective examples.

EXAMPLE 1

Preparation of First Volume Hologram Multilayer Structure (First Multilayer Structure Composed of Release Film/ hologram-recording Medium Layer/release Film)

A coating solution as volume hologram-recording material was gravure coated on a PET film (Lumirror T-60 available from Toray Industries, Inc. with a thickness of 50 μm) to have a post-drying thickness of 10 μm. The volume hologram-recording material had the following composition:

| | |
|---|---|
| polymethyl methacrylate resin (molecular weight: 200,000) | 500 parts by weight, |
| 3,9-diethyl-3'-carboxymethyl-2,2'-thiacarbocyanin iodine salt | 5 parts by weight, |
| diphenyliodonium hexafluoroantimonate | 60 parts by weight, |
| 2,2-bis[4-(acryloxydiethoxy)phenyl]propane | 800 parts by weight, and |
| pentaerythritol polyglycidyl ether | 800 parts by weight. |

A PET film with a surface subjected to a release treatment (SP-PET available from Tohcello Paper Co., Ltd. with a thickness of 50 μm) was laminated onto the surface of the thus obtained coating, thereby preparing the first multilayer structure.

(Second Multilayer Structure Composed of Substrate/ transparent Surface Protective Layer)

A coating solution as transparent surface protective layer material was uniformly coated on a PET film (Lumirror T-60 available from Toray Industries, Inc. with a thickness of 50 μm) by using a slide die to have a post-drying thickness of 2 μm, wherein the transparent surface protective layer material had the following composition:

| | |
|---|---|
| pentaerythritol triacrylate (PET30 available from Nippon Kayaku Co., Ltd.) | 4 parts by weight, |
| titanium oxide (HT0210 with particle diameter of 1.7 μm and refractive index 2.50, available from Toho Titanium Co., Ltd.) | 0.1 parts by weight, |
| dispersant (Disperbyk-163, available from BYK-Chemie Japan) | 0.05 parts by weight, |
| photoinitiator (IRGACURE-184, available from Ciba-Geigy Japan Limited) | 0.2 parts by weight, and |
| methyl isobutyl ketone | 37 parts by weight. |

The obtained coating was irradiated with ultraviolet radiation and cured at a dose 1000 mJ/cm² (365 nm conversion) by using an H valve of an ultraviolet (UV) radiation apparatus (available from Fusion UV curing systems, Inc.) as a light source, thereby preparing the second multilayer structure. After the substrate was released, the refractive index and the haze value of the transparent surface protective layer were measured, with the result that the refractive index was 1.54 and the haze value was 7.2%.

(Third Multilayer Structure Composed of Adhesive Layer/ release Sheet)

A heat-sensitive adhesive (EC1200, available from Chuorika Co., Ltd.) was coated on a PET film with a surface subjected to a release treatment (SP-PET with a thickness 50 μm, available from Tohcello Co., Ltd.), thereby preparing the third multilayer structure. The refractive index of the adhesive layer was measured and was 1.47.

(Preparation of the Volume Hologram Multilayer Structure)

A Lippmann hologram was recorded in the first multilayer structure using laser beam of 514 nm wavelength, followed by heating at 100° C. for 10 minutes. One of the release films of the first multilayer structure was released to expose a surface. Then, the second multilayer structure was laminated on the first multilayer structure at 80° C. such that the transparent surface protective layer meets the exposed surface, thereby obtaining a multilayer structure composed of the substrate/the transparent surface protective layer/the volume hologram layer/the release film.

The obtained multilayer structure was irradiated with ultraviolet radiation from a high-pressure mercury lamp at a dose of 2,500 mJ/cm² so as to fix the hologram. After that, the other release film was released to expose a surface, the third multilayer structure was laminated on the obtained multilayer structure at 100° C. such that the heat-sensitive adhesive layer meets the exposed surface, thereby obtaining a volume hologram multilayer structure composed of the substrate/the transparent surface protective layer/the volume hologram layer/the heat-sensitive adhesive layer/release sheet.

After the release sheet was released, the obtained volume hologram multilayer structure was laminated on a polyvinyl chloride card at 120–140° C., thereby manufacturing the first counterfeit-proof volume hologram seal. The diffraction efficiency of the hologram was 70%.

(Measurement of the Refractive Index of the Volume Hologram Layer)

The refractive index of the volume hologram layer was measured after the first multilayer structure, obtained above, was treated with radiation from a high-pressure mercury lamp at a dose of 2,500 mJ/cm², with the result that the refractive index was 1.52.

(Measurement of the Refractive Index of Medium in the Surface Protective Layer)

A surface protective layer was formed in the same manner as that of the second multilayer structure obtained above except that no particles have been added. The refractive index of the thus formed surface protective layer was measured and was 1.51.

(Refractive Index Ratios)

The refractive index of the medium of the surface protective layer was 1.51 and the refractive index of the particles was 2.50 so that $n_F/n_B=1.66$.

The refractive index of the surface protective layer in which the particles have been added was 1.54 and the refractive index of the volume hologram was 1.52 so that $n_P/n_H=1.01$.

The refractive index of the volume hologram layer was 1.52 and the refractive index of the adhesive layer was 1.47 so that $n_H/n_A=1.03$.

(Replication of the Volume Hologram)

The first multilayer structure obtained in the above was used as a replication medium. One of the release films thereof was released and fayed to a surface of a hologram seal. The replication medium and the hologram seal were irradiated with laser beam of 514 nm wavelength at the replication medium side similar to the above so as to replicate the volume hologram. The hologram formed in the replication medium was observed. There were many undesirable interference fringes recorded in appearance. The diffraction efficiency was 32% and the hologram was not bright enough so that the replicated hologram could not serve as a reproduction (copy).

EXAMPLE 2

(Second Multilayer Structure Composed of Substrate/transparent Surface Protective Layer)

A coating solution was uniformly coated on a PET film (Lumirror T-60 available from Toray Industries, Inc. with a thickness of 50 μm) by using a slide die to have a post-drying thickness of 2 μm, wherein the coating solution had the following composition:

| | |
|---|---|
| pentaerythritol triacrylate (PET30 available from Nippon Kayaku Co., Ltd.) | 4 parts by weight, |
| titanium oxide (HT0210 with particle diameter of 1.7 μm and refractive index 2.50, available from Toho Titanium Co., Ltd.) | 0.1 parts by weight, |
| titanium oxide (TTO51 (C) with particle diameter of 15 nm, available from Ishihara Sangyo Kaisha, Ltd.) | 10 parts by weight, |
| dispersant (Disperbyk-163, available from BYK-Chemie Japan) | 2 parts by weight, |
| photoinitiator (IRGACURE-184, available from Ciba-Geigy Japan Limited) | 0.2 parts by weight, and |
| methyl isobutyl ketone | 37 parts by weight. |

The obtained coating was irradiated with ultraviolet radiation and cured at a dose 1000 mJ/cm² (365 nm conversion) by using an H valve of an ultraviolet (UV) radiation apparatus (available from Fusion UV curing systems, Inc.) as a light source, thereby forming a transparent protective layer and thus obtaining the second multilayer structure. As for the transparent protective layer, the refractive index was 1.85 and the haze value was 6.4%.

(Preparation of the Volume Hologram Multilayer Structure)

After a hologram was recorded in a first multilayer structure which was the same as that in Example 1 in the same manner as Example 1, the second multilayer structure obtained in the above was laminated on the first multilayer structure at 100° C. such that the transparent surface protective layer meets the surface from which a release film has been released, thereby obtaining a multilayer structure composed of the substrate/the transparent surface protective layer/the volume hologram layer/the release film.

The obtained multilayer structure was irradiated with ultraviolet radiation from a high-pressure mercury lamp at a dose of 2,500 mJ/cm² so as to fix the hologram. After that, the release film was released to expose a surface, a third multilayer structure which was the same as that in Example 1 was laminated on the obtained multilayer structure at 100° C. such that the heat-sensitive adhesive layer meets the exposed surface, thereby obtaining a volume hologram multilayer structure composed of the substrate/the transparent surface protective layer/the volume hologram layer/the heat-sensitive adhesive layer/release sheet.

After the release sheet was released, the obtained volume hologram multilayer structure was laminated on a polyvinyl chloride card at 120–140° C., thereby manufacturing the first counterfeit-proof volume hologram seal. The diffraction efficiency of the hologram was 70%.

(Refractive Index Ratios)

In the second multilayer structure, the medium without the large-diameter particles was measured, with the result that the refractive index was 1.83. The refractive index of the large-diameter particles was 2.50 so that $n_F/n_B=1.37$.

The refractive index of the transparent surface protective layer was 1.85 and the refractive index of the volume hologram was 1.52 so that $n_P/n_H=1.21$.

The refractive index of the volume hologram layer was 1.52 and the refractive index of the adhesive layer was 1.47 so that $n_H/n_A=1.03$.

(Replication of the Volume Hologram)

The first multilayer structure obtained in the above was used as a replication medium. One of the release films thereof was released and fayed to a surface of a hologram seal. The replication medium and the hologram seal were irradiated with laser beam of 514 nm wavelength at the replication medium side so as to replicate the volume hologram.

The replication medium was released from the hologram seal and the hologram formed in the replication medium was observed. There were many undesirable interference fringes recorded in appearance and mists recorded as a whole. The diffraction efficiency was 22% and the hologram was not bright enough so that the replicated hologram could not serve as a reproduction (copy).

EXAMPLE 3

Preparation of First Volume Hologram Multilayer Structure (First Multilayer Structure Composed of Release Film/hologram-recording Medium Layer/release Film)

A coating solution as volume hologram-recording material was gravure coated on a PET film (Lumirror T-60 available from Toray Industries, Inc. with a thickness of 50 μm) to have a post-drying thickness of 10 μm. The volume hologram-recording material had the following composition:

| | |
|---|---|
| polymethyl methacrylate resin (molecular weight: 200,000) | 500 parts by weight, |
| 3,9-diethyl-3'-carboxymethyl-2,2'-thiacarbocyanin iodine salt | 5 parts by weight, |
| diphenyliodonium hexafluoroantimonate | 60 parts by weight, |
| 2,2-bis[4-(acryloxydiethoxy)phenyl]propane | 800 parts by weight, |
| pentaerythritol polyglycidyl ether | 800 parts by weight, and |
| calcium carbonate particles (mean particle size of 690 nm, refractive index of 1.60, available from Nitto Funka Kogyo K.K.) | 40 parts by weight. |

A PET film with a surface subjected to a release treatment (SP-PET available from Tohcello Paper Co., Ltd. with a thickness of 50 μm) was laminated onto the surface of the thus obtained coating, thereby preparing the first multilayer structure.

(Second Multilayer Structure Composed of Substrate/transparent Surface Protective Layer)

A coating solution was uniformly coated on a PET film (Lumirror T-60 available from Toray Industries, Inc. with a thickness of 50 μm) by using a slide die to have a post-drying thickness of 2 μm, wherein the coating solution had the following composition:

| | |
|---|---|
| pentaerythritol triacrylate (PET30 available from Nippon Kayaku Co., Ltd.) | 4 parts by weight, |
| photoinitiator (IRGACURE-184, available from Ciba-Geigy Japan Limited) | 0.2 parts by weight, and |
| methyl isobutyl ketone | 37 parts by weight. |

The obtained coating was irradiated with ultraviolet radiation and cured at a dose 1000 mJ/cm² (365 nm conversion) by using an H valve of an ultraviolet (UV) radiation apparatus (available from Fusion UV curing systems, Inc.) as a light source, thereby preparing the second multilayer structure. The refractive index of the transparent surface protective layer was 1.51.

(Preparation of the Volume Hologram Multilayer Structure)

A Lippmann hologram was recorded in the first multilayer structure using laser beam of 514 nm wavelength, followed by heating at 100° C. for 10 minutes. One of the release films of the first multilayer structure was released to expose a surface. Then, the second multilayer structure was laminated on the first multilayer structure at 80° C. such that the transparent surface protective layer meets the exposed surface, thereby obtaining a multilayer structure composed of the substrate/the transparent surface-protective layer/the volume hologram layer/the release film.

The obtained multilayer structure was irradiated with ultraviolet radiation from a high-pressure mercury lamp at a dose of 2,500 mJ/cm² so as to fix the hologram. After that, the other release film was released to expose a surface, a third multilayer structure which was the same as that in Example 1 was laminated on the obtained multilayer structure at 100° C. such that the heat-sensitive adhesive layer meets the exposed surface, thereby obtaining a volume hologram multilayer structure composed of the substrate/the transparent surface protective layer/the volume hologram layer/the heat-sensitive adhesive layer/release sheet.

After the release sheet was released, the obtained volume hologram multilayer structure was laminated on a polyvinyl chloride card at 120–140° C., thereby manufacturing the first counterfeit-proof volume hologram seal. The diffraction efficiency of the hologram was 57%.

(Measurement of the Refractive Index of the Volume Hologram Layer)

The refractive index of the volume hologram layer was measured after the first multilayer structure, obtained above, was treated with radiation from a high-pressure mercury lamp at a dose of 2,500 mJ/cm², with the result that the refractive index was 1.52.

(Refractive Index Ratios)

In the volume hologram layer, the refractive index of the medium without the large-diameter particles was 1.52, this value being found from the measurement in Example 1, and the refractive index of the particles was 1.60 so that $n_F/n_B = 1.05$.

The refractive index of the transparent surface protective layer was 1.51 and the refractive index of the volume hologram layer was 1.52 so that $n_P/n_H = 0.99$.

The refractive index of the volume hologram layer was 1.52 and the refractive index of the adhesive layer was 1.47 so that $n_H/n_A = 1.03$.

(Replication of the Volume Hologram)

The first multilayer structure obtained in Example 1 was used as a replication medium. One of the release films thereof was released and fayed to a surface of a hologram seal. The replication medium and the hologram seal were irradiated with laser beam of 514 nm wavelength at the replication medium side similar to the above so as to replicate the volume hologram.

The replication medium was released from the hologram seal and the hologram formed in the replication medium was observed. There were many undesirable interference fringes recorded in appearance. The diffraction efficiency was 28% and the hologram was not bright enough so that the replicated hologram could not serve as a reproduction (copy).

EXAMPLE 4

Preparation of Second Volume Hologram Multilayer Structure (Second Multilayer Structure Composed of Substrate/transparent Surface Protective Layer)

A coating solution was uniformly coated on a PET film (Lumirror T-60 available from Toray Industries, Inc. with a thickness of 50 μm) by using a slide die to have a post-drying thickness of 1 μm, wherein the coating solution had the following composition:

| | |
|---|---|
| pentaerythritol triacrylate (PET30 available from Nippon Kayaku Co., Ltd.) | 4 parts by weight, |
| titanium oxide (TTO51 (C) with particle diameter of 15 nm, available from Ishihara Sangyo Kaisha, Ltd.) | 10 parts by weight, |
| dispersant (Disperbyk-163, available from BYK-Chemie Japan) | 2 parts by weight, |
| photoinitiator (IRGACURE-184, available from Ciba-Geigy Japan Limited) | 0.2 parts by weight, and |
| methyl isobutyl ketone | 37 parts by weight. |

The obtained coating was irradiated with ultraviolet radiation and cured at a dose 1000 mJ/cm² (365 nm conversion) by using an H valve of an ultraviolet (UV) radiation apparatus (available from Fusion UV curing systems, Inc.) as a light source, thereby forming a transparent protective layer and thus obtaining the second multilayer structure. The refractive index of the transparent protective layer was 1.83.

(Preparation of the Volume Hologram Multilayer Structure)

After a hologram was recorded in a first multilayer structure which was the same as that in Example 1 in the same manner as Example 1, the second multilayer structure obtained in the above was laminated on the first multilayer structure at 100° C. such that the transparent surface protective layer meets the surface from which a release film has been released, thereby obtaining a multilayer structure composed of the substrate/the transparent surface protective layer/the volume hologram layer/the release film.

The obtained multilayer structure was irradiated with ultraviolet radiation from a high-pressure mercury lamp at a dose of 2,500 mJ/cm² so as to fix the hologram. After that, the release film was released to expose a surface, a third multilayer structure which was the same as that in Example 1 was laminated on the obtained multilayer structure at 100° C. such that the heat-sensitive adhesive layer meets the exposed surface, thereby obtaining a volume hologram multilayer structure composed of the substrate/the transparent surface protective layer/the volume hologram layer/the heat-sensitive adhesive layer/release sheet.

After the release sheet was released, the obtained volume hologram multilayer structure was laminated on a polyvinyl chloride card at 120–140° C., thereby manufacturing the second counterfeit-proof volume hologram seal. The diffraction efficiency of the hologram was 67%.

The refractive index of the transparent surface protective layer was 1.83 and the refractive index of the volume hologram was 1.52 so that $n_P/n_H=1.20$.

The refractive index of the volume hologram layer was 1.52 and the refractive index of the adhesive layer was 1.47, this value being found from the measurement in Example 1, so that $n_H/n_A=1.03$.

EXAMPLE 5

Preparation of Third Volume Hologram Multilayer Structure (Second Multilayer Structure Composed of Transparent Surface Protective Film/first Adhesive Layer)

A coating solution was coated on a PET film (Lumirror T-60 available from Toray Industries, Inc. with a thickness of 50 µm) to have a post-drying thickness of 2 µm, thereby obtaining the second multilayer structure. The coating solution had the following composition:

| | |
|---|---|
| heat-sensitive adhesive (AD1790 available from Toyo Morton Co., Ltd.) | 100 parts by weight, and |
| calcium carbonate particles (mean particle size of 690 nm, refractive index of 1.60, available from Nitto Funka Kogyo K.K.) | 1 part by weight. |

The refractive index of the first adhesive layer was 1.48 and the haze value was 7.9.

(Preparation of the Volume Hologram Multilayer Structure)

A hologram was recorded in a first multilayer structure which was the same as that in Example 1 in the same manner as Example 1 and was irradiated with radiation from a high-pressure mercury lamp at a dose of 2,500 mJ/cm² so as to fix the hologram. After that, the release film was released to expose a surface, the second multilayer structure obtained in the above was laminated on the first multilayer structure at 80° C., thereby obtaining a multilayer structure composed of the transparent surface protective film/the first adhesive layer/the volume hologram layer/the release film.

The release film of the obtained multilayer structure was released to expose a surface. Then, a third multilayer structure which was the same as that of Example 1 was laminated on the obtained multilayer structure at 100° C. such that the heat-sensitive adhesive layer meets the exposed surface, thereby preparing a third volume hologram multilayer structure composed of the transparent surface protective film/the first adhesive layer/the volume hologram layer/the second adhesive layer/release sheet.

After the release sheet was released, the obtained volume hologram multilayer structure was laminated on a polyvinyl chloride card at 120–140° C., thereby manufacturing the third counterfeit-proof volume hologram seal. The diffraction efficiency of the hologram was 70%.

In the second multilayer structure obtained in the above, the refractive index of the first adhesive layer without large-diameter particles dispersed was 1.47.

(Refractive Index Ratios)

The refractive index of the medium in the first adhesive layer was 1.47, this value being found from the measurement in Example 1, and the refractive index of the large-diameter particles was 1.60 so that $n_F/n_B=1.08$.

The refractive index ($n_P$) of the transparent surface protective film was 1.52 and the refractive index of the first adhesive layer was 1.48 so that $n_P/n_{A1}=1.02$.

The refractive index of the first adhesive layer was 1.48 and the refractive index of the volume hologram layer was 1.52 so that $n_{A1}/n_H=0.97$.

(Replication of the Volume Hologram)

The first multilayer structure obtained in Example 1 was used as a replication medium. One of the release films thereof was released and fayed to a surface of a hologram seal. The replication medium and the hologram seal were irradiated with laser beam of 514 nm wavelength at the replication medium side similar to the above so as to replicate the volume hologram.

The replication medium was released from the hologram seal and the hologram formed in the replication medium was observed. There were many undesirable interference fringes recorded in appearance and the hologram was not bright enough so that the replicated hologram could not serve as a reproduction (copy). The diffraction efficiency was 28%.

EXAMPLE 6

Preparation of Fourth Volume Hologram Multilayer Structure (Second Multilayer Structure Composed of Transparent Surface Protective Film/first Adhesive Layer)

A coating solution was uniformly coated on a PET film (Lumirror T-60 available from Toray Industries, Inc. with a thickness of 50 µm) by using a slide die to have a post-drying thickness of 4 µm, wherein the coating solution had the following composition:

| | |
|---|---|
| pentaerythritol triacrylate (PET30 available from Nippon Kayaku Co., Ltd.) | 4 parts by weight, |
| titanium oxide (TTO51 (C) with particle diameter of 15 nm, available from Ishihara Sangyo Kaisha, Ltd.) | 10 parts by weight, |
| dispersant (Disperbyk-163, available from BYK-Chemie Japan) | 2 parts by weight, |
| photoinitiator (IRGACURE-184, available from Ciba-Geigy Japan Limited) | 0.2 parts by weight, and |
| methyl isobutyl ketone | 37 parts by weight. |

(Preparation of the Volume Hologram Multilayer Structure)

A hologram was recorded in a first multilayer structure which was the same as that in Example 1 in the same manner as Example 1, followed by UV cure. After that, the second multilayer structure obtained in the above was laminated on the first multilayer structure at room temperature such that the transparent surface protective layer meets the surface from which a release film was released, and then subjected to UV radiation by using a high-pressure mercury lamp so as to cure the first adhesive layer. Accordingly, the adhesive force between the surface protective film and the volume hologram was increased. In this manner, a multilayer structure composed of the transparent surface protective film/the first adhesive layer/the volume hologram layer/the release film was obtained.

The release film of the obtained multilayer structure was released to expose a surface. Then, a third multilayer structure which was the same as that of Example 1 was laminated on the obtained multilayer structure at 100° C. such that the heat-sensitive adhesive layer meets the exposed surface, thereby preparing a fourth volume hologram multilayer structure composed of the transparent surface protective film/the first adhesive layer/the volume hologram layer/the heat-sensitive adhesive layer/the release sheet.

After the release sheet was released, the obtained volume hologram multilayer structure was laminated on a polyvinyl chloride card at 120–140° C., thereby manufacturing the fourth counterfeit-proof volume hologram seal. The diffraction efficiency was 67%.

The refractive index ($n_P$) of the transparent surface protective film was 1.52 and the refractive index of the first adhesive layer was 1.83 so that $n_P/n_{A1}=0.83$.

The refractive index of the first adhesive layer was 1.83 and the refractive index of the volume hologram layer was 1.52 so that $n_{A1}/n_H=1.20$.

(Replication of the Volume Hologram)

The first multilayer structure obtained in Example 1 was used as a replication medium. One of the release films thereof was released and fayed to a surface of a hologram seal. The replication medium and the hologram seal were irradiated with laser beam of 514 nm wavelength at the replication medium side similar to the above so as to replicate the volume hologram.

The replication medium was released from the hologram seal and the hologram formed in the replication medium was observed. There were many undesirable interference fringes recorded in appearance and mists recorded as a whole. The hologram was not bright enough so that the replicated hologram could not serve as a reproduction (copy). The diffraction efficiency was 31%.

What we claim is:

1. A counterfeit-proof volume hologram multilayer structure comprising a transparent surface protective layer, a volume hologram layer, and an adhesive layer which are sequentially laminated, said counterfeit-proof volume hologram multilayer structure being characterized in that particles having particle diameter of 350 nm or more are dispersed in at least one of the transparent surface protective layer, the volume hologram layer, and the adhesive layer and that the refractive index ratio ($n_F/n_B$) is set to be not less than 1.05 or not greater than 0.95, wherein $n_F$ is the refractive index of the particles and $n_B$ is the refractive index of the medium in which the particles are dispersed.

2. A counterfeit-proof volume hologram multilayer structure comprising a transparent surface protective layer, a volume hologram layer, and an adhesive layer which are sequentially laminated, said counterfeit-proof volume hologram multilayer structure being characterized in that at least either the refractive index ratio ($n_P/n_H$) between the transparent surface protective layer and the volume hologram layer or the refractive index ratio ($n_H/n_A$) between the volume hologram layer and the adhesive layer is set to be not less than 1.08, wherein $n_P$ is the refractive index of the transparent surface protective layer, $n_H$ is the refractive index of the volume hologram layer, and $n_A$ is the refractive index of the adhesive layer.

3. A counterfeit-proof volume hologram multilayer structure as claimed in any one of claim 1 or 2, wherein the adhesive layer is a heat sensitive adhesive layer or a pressure sensitive adhesive layer.

4. A counterfeit-proof volume hologram multilayer structure comprising a transparent surface protective layer, a first adhesive layer, a volume, hologram layer, and a second adhesive layer which are sequentially laminated, said counterfeit-proof volume hologram multilayer structure being characterized in that particles having particle diameter of 350 nm or more are dispersed in at least one of the transparent surface protective layer, the first adhesive layer, the volume hologram layer, and the second adhesive layer and that the refractive index ratio ($n_F/n_B$) is set to be not less than 1.05 or not greater than 0.95, wherein $n_F$ is the refractive index of the particles and $n_B$ is the refractive index of the medium in which the particles are dispersed.

5. A counterfeit-proof volume hologram multilayer structure as claimed in claim 1 or 4, wherein the haze value of the layer into which the particles are dispersed is in a range from 5% to 15%.

6. A counterfeit-proof volume hologram multilayer structure as claimed in claim 5, wherein the transparent surface protective layer is colored by a pigment or dye having absorbency relative to reconstruction wavelength light for the volume hologram.

7. A counterfeit-proof volume hologram multilayer structure comprising a transparent surface protective layer, a first adhesive layer, a volume hologram layer, and a second adhesive layer which are sequentially laminated, said counterfeit-proof volume hologram multilayer structure being characterized in that at least one of the refractive index ratio ($n_P/n_{A1}$) between the transparent surface protective layer and the first adhesive layer, the refractive index ratio ($n_{A1}/n_H$) between the first adhesive layer and the volume hologram layer, and the refractive index ratio ($n_H/n_{A2}$) between the volume hologram layer and the second adhesive layer is set to be not less than 1.08, wherein $n_P$ is the refractive index of the transparent surface protective layer, $n_{A1}$ is the refractive index of the first adhesive layer, $n_H$ is the refractive index of the volume hologram layer, and $n_{A2}$ is the refractive index of the second adhesive layer.

8. A counterfeit-proof volume hologram multilayer structure as claimed in any one of claim 4 or 7, wherein at least one of the first adhesive layer and the second adhesive layer is a heat sensitive adhesive layer or a pressure sensitive adhesive layer.

9. A counterfeit-proof volume hologram multilayer structure as claimed in any one of claims 1 through 7, wherein the transparent surface protective layer is colored by a pigment or dye having absorbency relative to reconstruction wavelength light for the volume hologram.

10. A counterfeit-proof volume hologram multilayer structure as claimed in any one of claims 1 through 7, wherein the transparent surface protective layer is a transparent surface protective coating or is a combination of a transparent surface protective coating and a substrate laminated on the outer surface of the transparent surface protective coating.

11. A counterfeit-proof volume hologram multilayer structure as claimed in any one of claims 1 through 7, wherein the transparent surface protective layer is a transparent surface protective film or is a combination of a transparent surface protective film and a substrate laminated on the outer surface of the transparent surface protective film.

12. A counterfeit-proof volume hologram seal comprising a transparent surface protective layer, a volume hologram layer, an adhesive layer, and an adherend which are sequentially laminated, said counterfeit-proof volume hologram seal being characterized in that particles having particle diameter of 350 nm or more are dispersed in at least one of the transparent surface protective layer, the volume hologram layer, and the adhesive layer and that the refractive index ratio ($n_F/n_B$) is see to be not less than 1.05 or not greater than 0.95, wherein $n_F$ is the refractive index of the particles and $n_B$ is the refractive index of the medium in which the particles are dispersed.

13. A counterfeit-proof volume hologram seal comprising a transparent surface protective layer, a volume hologram layer, an adhesive layer, and an adherend which are sequentially laminated, said counterfeit-proof volume hologram seal being characterized in that at least either the refractive index ratio ($n_P/n_H$) between the transparent surface protective layer and the volume hologram layer or the refractive index ratio ($n_H/n_A$) between the volume hologram layer and the adhesive layer is set to be not less than 1.08, wherein $n_P$ is the refractive index of the transparent surface protective layer, $n_H$ is the refractive index of the volume hologram layer, and $n_A$ is the refractive index of the adhesive layer.

14. A counterfeit-proof volume hologram seal comprising a transparent surface protective layer, a first adhesive layer, a volume hologram layer, a second adhesive layer, and an adherend which are sequentially laminated, said counterfeit-proof volume hologram seal being characterized in that particles having particle diameter of 350 nm or more are dispersed in at least one of the transparent surface protective layer, the first adhesive layer, the volume hologram layer, and the second adhesive layer and that the refractive index ratio ($n_P/n_B$) is set to be not less than 1.05 or not greater than 0.95, wherein $n_P$ is the refractive index of the particles and $n_B$ is the refractive index of the medium in which the particles are dispersed.

15. A counterfeit-proof volume hologram seal comprising a transparent surface protective layer, a first adhesive layer, a volume hologram layer, a second adhesive layer, and an adherend which are sequentially laminated, said counterfeit-proof volume hologram seal being characterized in that at least one of the refractive index ratio ($n_P/n_{A1}$) between the transparent surface protective layer and the first adhesive layer, the refractive index ratio ($n_{A1}/n_H$) between the first adhesive layer and the volume hologram layer, and the refractive index ratio ($n_H/n_{A2}$) between the volume hologram layer and the second adhesive layer is set to be not less than 1.08, wherein $n_P$ is the refractive index of the transparent surface protective layer, $n_{A1}$ is the refractive index of the first adhesive layer, $n_H$ is the refractive index of the volume hologram layer, and $n_{A2}$ is the refractive index of the second adhesive layer.

* * * * *